US009137200B2

(12) United States Patent
Blau et al.

(10) Patent No.: US 9,137,200 B2
(45) Date of Patent: Sep. 15, 2015

(54) ICE BASED NAT TRAVERSAL

(75) Inventors: Staffan Blau, Stockholm (SE); Hubert Przybysz, Hagersten (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 163 days.

(21) Appl. No.: 13/388,236

(22) PCT Filed: Jan. 17, 2012

(86) PCT No.: PCT/EP2012/050663
§ 371 (c)(1),
(2), (4) Date: Jan. 31, 2012

(87) PCT Pub. No.: WO2013/107504
PCT Pub. Date: Jul. 25, 2013

(65) Prior Publication Data
US 2013/0185440 A1    Jul. 18, 2013

(51) Int. Cl.
*G06F 15/16* (2006.01)
*H04L 29/12* (2006.01)
*H04L 29/06* (2006.01)

(52) U.S. Cl.
CPC ........ *H04L 61/2528* (2013.01); *H04L 61/2564* (2013.01); *H04L 61/2575* (2013.01);
(Continued)

(58) Field of Classification Search
CPC ............ H04L 61/2564; H04L 65/1016; H04L 29/06027; H04L 29/125; H04L 29/12537; H04L 61/2578; H04L 63/029; H04L 63/20; H04L 61/2528; H04L 61/2575; H04L 61/2589; H04L 65/1006; H04L 65/1069; H04L 29/12528; H04L 61/2567; H04L 29/1249; H04L 29/12509; H04L 29/12556; H04L 45/72; H04L 61/256; H04L 61/2585

USPC .......................................... 709/224, 227, 228
See application file for complete search history.

(56) References Cited

U.S. PATENT DOCUMENTS

2004/0249887 A1* 12/2004 Garcia-Martin et al. ..... 709/204
2008/0062993 A1    3/2008 Levy et al.
(Continued)

OTHER PUBLICATIONS

3GPP TS 24.229 v11.2.1 (Jan. 2012) TEchnical Specification, 3rd Generation Partnership Project; Technical Specification Group Core Network and Terminals; IP mulimedia call control protocol based on SEssion Initiation Protocl (SIP) and Session Description Protocol (SDP); Stage 3 (Release 11), 716 pages.*
(Continued)

*Primary Examiner* — Brian J Gillis
*Assistant Examiner* — Shean Tokuta
(74) *Attorney, Agent, or Firm* — Myers Bigel Sibley & Sajovec, PA

(57) ABSTRACT

An originating P-CSCF node receives a SIP INVITE request from first user equipment (UE) that originates a call to a second UE. If a relay candidate address for the first UE is not present in the SIP INVITE request, the SIP INVITE request is modified to include a first address provided by an originating IMS-AGW node as a relay candidate for the first UE and forwarded to the second UE. The originating P-CSDF node receives a SIP INVITE response message from the second UE in response to the SIP INVITE request. If a relay candidate address for the second UE is not present in the SIP INVITE response, the SIP invite response is modified to include a second address provided by an originating IMS-AGW node as a relay candidate for the second UE and forwarded t the first UE. The address information is used by both UEs in ICE operations.

15 Claims, 11 Drawing Sheets

(52) U.S. Cl.
CPC ........ *H04L61/2589* (2013.01); *H04L 65/1006* (2013.01); *H04L 65/1016* (2013.01); *H04L 65/1069* (2013.01)

(56) References Cited

U.S. PATENT DOCUMENTS

| | | | | |
|---|---|---|---|---|
| 2008/0159306 | A1* | 7/2008 | Pande et al. | 370/401 |
| 2008/0159313 | A1* | 7/2008 | Rasanen | 370/401 |
| 2009/0010270 | A1* | 1/2009 | Ejzak | 370/401 |
| 2009/0274146 | A1* | 11/2009 | Zhu | 370/352 |
| 2009/0316708 | A1* | 12/2009 | Yahyaoui et al. | 370/401 |
| 2010/0268763 | A1* | 10/2010 | Rasanen | 709/203 |
| 2010/0293297 | A1* | 11/2010 | Perumal et al. | 709/245 |

OTHER PUBLICATIONS

LM Ericsson, "Discussion on P-CSCF/AGW procedures for ICE and HNT", 3GPP TSG CT WG1 Meeting #49 Kobe, Japan Oct. 8-12, 2007, 3 Pages.

International Search Report Corresponding to International Application No. PCT/EP2012/050663; Date of Mailing: Oct. 15, 2012; 13 pages.

ETSI TS 123 228 v10.7.0 (Jan. 2012), Technical Specification, Digital cellular telecommunications system (Phase 2+); Universal Mobile Telecommunications System (UMTS); LTE; IP Multimedia Subsystem (IMS); Stage 2 (3GPP TS 23.228 version 10.7.0 Release 10), 274 pages.

3GPP TS 24.229 v11.2.1 (Jan. 2012), Technical Specification, $3^{rd}$ Generation Partnership Project; Technical Specification Group Core Network and Terminals; IP multimedia call control protocol based on Session Initiation Protocol (SIP) and Session Description Protocol (SDP); Stage 3 (Release 11), 716 pages.

Rosenberg, J., Interactive Connectivity Establishment (ICE): A Protocol for Network Address Translator (NAT) Traversal for Offer/Answer Protocols, Internet Engineering Task Force, http://www.rfc-editor.org/info/rfc5245, Dec. 15, 2011, 235 pages.

3GPP TS 23.228 V9.4.0 (Sep. 2010), $3^{rd}$ Generation Partnership Project; Technical Specification Group Services and System Aspects; IP Multimedia Subsystem (IMS); Stage 2, (Release 9), 253 pages.

3GPP TS 24.229 V9.9.0 (Sep. 2011), $3^{rd}$ Generation Partnership Project; Technical Specification Group Core Network and Terminals; IP multimedia call control protocol based on Session Initiation Protocol (SIP) and Session Description Protocol (SDP), Stage 3, (Release 9), 678 pages.

Notification Concerning Transmittal of International Preliminary Report on Patentability in corresponding PCT Application No. PCT/EP2012/050663 mailed Jan. 31, 2014 (24 pages).

* cited by examiner

ICE BASED NAT TRAVERSAL

CROSS REFERENCE TO RELATED APPLICATIONS

This application is a 35 U.S.C. §371 national stage application of PCT International Application No. PCT/EP2012/050663, filed on 17 Jan. 2012, the disclosure and content of which is incorporated by reference herein hi its entirety.

TECHNICAL FIELD

The present invention relates to methods and apparatus in a communication network for session establishment between user equipment behind network address translation (NAT) devices. More particularly, the invention relates to methods and apparatus for establishing a multimedia session in a communication network including an Internet Protocol (IP) Multimedia Subsystem (IMS) when user equipment are located behind NAT devices.

BACKGROUND

Internet Protocol Multimedia (IPMM) services provide a dynamic combination of voice, video, messaging, data, etc, within the same call or media session (multimedia session). By growing the numbers of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IP Multimedia Subsystem (IMS) network (also referred to as IMS) is the technology defined by the Third Generation Partnership Project (3GPP) to provide IPMM services over fixed and mobile communication networks. IMS provides key features to enrich the end-user person-to-person communication experience through the integration and interaction of services. IMS allows new rich person-to-person (client-to-client) as well as person-to-content (client-to-server) communications over Internet Protocol (IP)-based networks. The IMS makes use of the Session Initiation Protocol (SIP) to set up and control calls or multimedia sessions between user equipment and application servers. The Session Description Protocol (SDP), carried by SIP signalling, is used to describe and negotiate the media components of the call or multimedia session. In addition to SIP, other protocols may be used for media transmission and control, such as Real-time Transport Protocol and Real-time Transport Control Protocol (RTP/RTCP).

A user equipment (UE) may comprise or represent any device used for communications over an IP-based communications network. Examples of UEs that may be used in certain embodiments of the described communication or access networks are fixed, wired or wireline devices, or mobile or wireless devices for accessing an IP based communication network, the devices may include, but are not limited to, computers, terminals, telephones, mobile handsets, mobile phones, smart phones, portable computing devices such as lap tops, handheld devices, tablets, net-books, computers, personal digital assistants, customer premises equipment, modems and other communication devices that may access an IP based communication network.

FIG. 1a illustrates schematically a communication network 100 in which a first UE 101 originates a call or multimedia session towards a second UE 103, the first UE 101 is located in an originating network 102 and the second UE 103 is located a terminating network 104. The first UE 101 and second UE 103 may communicate with each other through IMS network 105. The first UE 101 accesses the IMS network 105 via a first access network 106 within the originating network 102, and the second UE 103 accesses IMS network 105 via a second access network 107 within the terminating network 104. In addition, in the communication path between the first UE 101 and the IMS network 105 there is a first NAT device 108 in the originating network 102. Similarly, in the communication path between the second UE 103 and the IMS network 105 is a second NAT device 109 in the terminating network 104.

First and second NAT devices 108 and 109 allow a single public IP address to be shared between a number of UEs or IP hosts. UEs behind NAT devices (e.g. the first UE 101 is behind the first NAT device 108 and the second UE 103 is behind second NAT device 109) may be given IP addresses that are in a private IP address space allocated by a system administrator, an operator, or operators of first and second access networks 106 and 107. These private addresses may not be routable over a public IP-based network, for example, the Internet or another operator's access network, for example, over IMS network 105 and other communications networks. The first and second NAT devices 108 and 109 create temporary bindings between the public and private address space(s) on a per-connection basis. A binding is a mapping between the public address and port to a private address and port associated with a specific transport, for example, the user datagram protocol (UDP) or transmission control protocol (TCP).

The first and second access networks 106 and 107 may include any core network or access network technology including, but not limited to, various support entities or nodes (not shown) such as various interface nodes, access points, routers, LAN bridges, switches, base stations, switching centers, network gateways that provide an interface between the first and second access networks 106 and 107 and the IMS network 105. This will allow the first and second UEs 101 and 103 to communicate with each other through IMS network 105.

When a calling party such as user A of the first UE 101 originates a call or initiates a multimedia session to or with a called party such as user B of the second UE 103 the set-up process involves an originating call associated with the first UE 101 set up in the originating network 102 and a terminating call associated with the second UE 103 set up in the terminating network 104.

The terms "originating call" and "terminating call" may comprise or represent the session or connection set-up signalling in relation to the first UE 101 and the second UE 103, respectively. Examples of originating or terminating calls that may be used in certain embodiments of the described network, include but are not limited to, the connection set-up signalling enabling a communication connection to be made between user A of the first UE 101 and user B of the second UE 103 in the two call halves model. The originating call is the connection set-up signalling for user A of the first UE 101 in relation to the originating network 102 in the first call half and the terminating call is the connection set-up signalling for connecting the call with user B of second UE 103 in relation to terminating network 104 in the second call half.

The IMS network 105 includes an originating IMS 110 associated with the originating network 102 and a terminating IMS 111 associated with the terminating network 104. The originating and terminating IMS networks 110 and 111 may include network entities, nodes, or IMS network nodes that send/receive signals to/from the first and second access networks 106 and 107, respectively. These IMS network nodes connect with the first and second access networks 106 and 107 via the access network gateway or switching center nodes. The IMS network nodes may include Call/Session Control Function (CSCF) nodes, which operate as SIP proxies within the IMS network 105. The 3GPP architecture defines several types of CSCF nodes: the Proxy CSCF (P-CSCF) node which is typically the first point of contact within the IMS network 105 for UEs, which are SIP enabled; the Serving CSCF (S-CSCF) node provides services to the user that the user is subscribed to; and the Interrogating CSCF (I-CSCF) node whose role is to identify the correct S-CSCF and to forward to that S-CSCF a request received from a UE via P-CSCF node.

In this example, it is assumed that the first UE 101 is subscribed to IMS services, which include IMS voice services, messaging, video, multimedia etc. When the first UE 101 originates a call or multimedia session with the second UE 103, the first UE 101 will be the calling party and the call signalling of the first call half is the originating call in relation to the first UE 101. As the first UE 101 will use IP addressing, since this will be an IP-based call or multimedia session, the call set-up signalling will be directed from the first UE 101 via the first NAT 108 to the originating IMS network 110 in the originating network 102. As the second UE 103 is located in the terminating network 104, IMS network 110 sends the call set-up signalling to IMS network 111 for setting up the call signalling towards the called party, which is the second UE 103, and the call signalling of the second call half, i.e. the terminating call in relation to the second UE 103 is directed via the second NAT device 109 to second UE 103. The first and second UEs 101 and 103 will communicate through the IMS network 105 using SIP messaging to set up and control calls or multimedia sessions.

However, for SIP and SDP messages sent through the IMS network 105, the IP address located in the SIP Contact header and the SDP connection address (c-line) is usually identical because UEs will send SIP messages from the same IP address that they want to receive media at. Within the IMS network 105, SIP signalling and the multimedia session do not traverse the same network nodes as they are transported end-to-end independently of each other. The first and second NAT devices 108 and 109 will usually not be aware of the complex relations between the different signalling protocols and may not take these relations into account when performing IP address translation. This means SIP signalling, which the IMS network 105 uses for most call set-up signalling, may not be able to be used for UEs behind first and second NAT devices 108 or 109.

NAT traversal mechanisms allow a UE to find out whether it is behind a NAT device and to become aware of the public transport addresses (IP addresses and ports), such as public IP addresses and the public addresses of the remote end, which is the second UE in terminating network 104. The 3GPP Technical specification TS 24.229 specifies two NAT traversal mechanisms that will allow SIP signalling end-to-end for setting up multimedia sessions between UEs behind a NAT device using SIP. These are referred to as Interactive Connection Establishment (ICE) (or UE Managed NAT Traversal) and the Hosted NAT traversal (or Network Managed NAT Traversal).

FIGS. 1*b* and 1*c* are a schematic diagram and a signal flow diagram, respectively, illustrating an example of an ICE NAT traversal between the first UE 101 and the second UE 103 via originating and terminating networks 102 and 104. The first UE 101 and second UE 103 include a SIP port and a media port, the SIP port is used for SIP signaling represented by solid arrows, and the media port is the interface to the media bearers represented by dashed arrows for transporting traffic or media. It is assumed that the first and second UE 101 and 103 supports the ICE based NAT traversal.

Prior to initiating a multimedia session and setting up a multimedia stream, the first UE 101 interacts with a Traversal Using Relays around NAT (TURN) server 112*a* in the communication network 100 to discover a public transport address (IP address and port number) that the TURN server 112*a* may allocate to the first UE 101 such as IP address A3. The TURN server 112*a* provides relay functionality within communications network 100 so media can traverse first NAT device 108 via the TURN server 112*a*. The first UE 101 interacts with a Session Traversal Utilities NAT (STUN) server 113*a* to discover the public address, e.g. IP address A2, when first UE 101 is located behind first NAT device 108.

Given the transport address information from the TURN server 112*a* and/or STUN server 113*a*, the first UE 101 originates the call by sending towards the second UE 103, a SIP INVITE (call setup request) request message with an SDP offer including candidate address information based on the transport address information. The SIP INVITE request message traverses communication network 100 via an originating IMS-P-CSCF node 114*a* of the originating network 104 and terminating IMS-P-CSCF node 114*b* of terminating network 104.

In this example, the candidate address information includes three transport address candidates for the first UE 101, which are a relay transport address candidate for the first UE 101 (e.g. IP address A3 from TURN server 112*a*), a server reflexive address candidate for the first UE 101 (e.g. IP address A2 from STUN server 113*a*), and a local host address transport address candidate for the first UE 101 (e.g. IP address A). If only one of the endpoints (UEs) supports ICE, the TURN relay transport address will always be used (assuming there is a TURN server available in the network).

On receiving the SIP INVITE request message and the SDP offer from the first UE 101, the second UE 103 interacts with TURN and STUN servers 112*b* and 113*b* to gather candidate address information for the second UE 103 in the same manner as the first UE 101. The second UE 103 transmits towards the first UE 101, a SIP INVITE (call setup response) response message including an SDP answer (session description) including the candidate address information via terminating IMS-P-CSCF node 114*b* and the originating IMS-P-CSCF node 114*a*. The candidate address information for the second UE 103 includes three transport address candidates, which are a relay transport address candidate for the second UE 103 (e.g. IP address B3 from TURN server 112*b*), the server reflexive address candidate for the second UE 103 (e.g. IP address B2 from STUN server 113*b*), and the local host address candidate for the second UE 103 (e.g. IP address B).

After receiving the corresponding candidate address information from each other, the first and second UEs 101 and 103 perform the ICE procedure. In this procedure, the first and second UEs 101 and 103 send ICE connectivity checks to the transport address candidates received from the other UE 103 or 101 (endpoint). If only one endpoint is behind NAT device 108 or 109, or the involved NAT device(s) 108 and/or 109 are not address restrictive, then either the connectivity checks on the host address candidate(s) or the server reflexive address candidate(s) will succeed. This means TURN servers 112*a* and 112*b* are not required. In this case, the UEs 101 and 103 interact with TURN servers 112a and 112b to de-allocate the relay resources the TURN servers 112a and 112b tentatively previously reserved.

For ICE based NAT traversal, to not always result in using a TURN server 112a or 112b for relaying the traffic requires the first and second UEs 101 and 103 to support the ICE mechanism, or the IMS network 105 has to act as a back-to-back user agent (B2BUA) with regards to the ICE mechanism. However, there may also be many UEs that do not support ICE functionality such as legacy UEs and even some newer UEs. For NAT traversal to be possible for the UEs that do not support ICE and where NAT traversal is not solved on customer premises (through use of intelligent NAT devices such as Universal Plug and Play (UpNP) or SIP application layer gateway (ALG) based NAT traversal), IMS supports another NAT traversal mechanism called Hosted NAT traversal, which is relay based and similar to TURN server based NAT traversal.

FIGS. 1d and 1e are a schematic diagram and a signal flow diagram, respectively, illustrating an example of a Hosted NAT traversal mechanism between the first UE 101 and the second UE 103 via originating and terminating networks 102 and 104. The first and second UEs 101 and 103 include a SIP port and a media port, the SIP port is used for SIP signaling represented by solid arrows, and the media port is the interface to the media bearers etc represented by dashed arrows. It is assumed that the first and second UE 101 and 103 do not support the ICE based NAT traversal mechanism.

In the Hosted NAT traversal mechanism, the originating and terminating IMS P-CSCF nodes 114a and 114b perform NAT traversal by manipulating the transport address information in the media descriptions of the SDP offer and answer exchanged in the SIP signalling between the first and second UE 101 and 103. In doing so, the IMS P-CSCF nodes 114a and 114b place or insert IMS Access Gateway (IMS AGW) nodes 115a and 115b into the communication path between the first and second UEs 101 and 103 so that the media session is relayed via the IMS-AGW nodes 115a and 115b.

Each of the IMS-AGW nodes 115a and 115b, will, if there is a NAT device 108 or 109 between it and the corresponding UE 101 or 103, do Hosted NAT traversal. This means the IMS-AGW node 115a and 115b discover the transport address (and port) used on the IMS side of the first and second NAT devices. This is performed by inspecting the source transport address information in the first packet received from each UE 101 and 103, respectively. This source transport address information is used as the destination transport address information for packets relayed in the other direction.

In this way, a multimedia session is set up between the first UE 101 and the second UE 103 such that the first and second NAT devices 108 and 109 are not required to manipulate the SIP signalling. However, this means that the communication path between the first and the second UEs 101 and 103 includes first and second NAT devices 108 and 109 and originating and terminating IMS-AGW nodes 115a and 115b. All of these devices and nodes need to perform address translation to allow multimedia session packets to be transmitted/received by the first and second UEs 101 and 103 resulting in increasing delays for multimedia packets traversing the communication path between the first and second UEs 101 and 103.

There are many reasons why the IMS P-CSCF nodes 114a and 114b may route multimedia sessions via an IMS-AGW nodes 115a and 115b. It may be due to a general security policy (e.g. authentication purposes), or required for mapping a specific multimedia session between IPv6 transport and IPv4 transport, or required for NAT traversal and at least one of the first and/or second UEs 101 and/or 103 does not support ICE, or for any other reason etc. However, if the first UE 101 and/or the second UE 103 uses ICE based NAT traversal and the IMS P-CSCF nodes 114a and 114b route the multimedia session via an IMS-AGW nodes 115a and 115b, then the ICE mechanism would result in choosing the relay candidate address (from TURN server 112a and/or 112b). This results in a TURN server 112a and/or 112b in series with IMS-AGW nodes 115a and/or 115b. This means the communications path between the first and second UEs 101 and 103 may include first and second NAT devices 108 and 109, TURN servers 112a and 112b, and IMS AGW nodes 115a and 115b, resulting in increasing delays for multimedia packets traversing the communication path between the first and second UEs 101 and 103.

This can be alleviated if the IMS P-CSCF nodes 114a and 114b can terminate the ICE signalling in the SIP signalling and SDP offer/answer bodies while the IMS-AGW nodes 115a and 115b terminates the ICE connectivity checks in the media plane. This is illustrated in FIG. 1f, which is a signalling flow diagram illustrating an example of a combined NAT traversal mechanism incorporating Hosted NAT traversal and ICE based NAT traversal. As specified in 3GPP TS 24.229, the IMS AGW nodes 115a and 115b can terminate the ICE signalling by replacing the ICE mechanisms address candidates in the SDP offer/answer bodies with host candidate addresses provided by the corresponding IMS AGW nodes 115a and 115b (e.g. IP addresses T1, T2, T3, or T4).

This means the communication network 100 will use Hosted NAT traversal and even if ICE mechanism is supported and used by the UEs 101 and 103, then the host candidate address will always be selected by the ICE mechanism, so there would never be both an IMS-AGW node and a TURN server in the established end-to-end media connection. However, this still means that the communication path between the first and the second UEs 101 and 103 will still include first and second NAT devices 108 and 109 and IMS-AGW nodes 115a and 115b, which need to perform address translation to allow multimedia session packets to be transmitted/received by the first and second UEs 101 and 103. This still results in delays for multimedia packets traversing the communication path between the first and second UEs 101 and 103 through first and second NAT devices 108 and 109 and IMS-AGW nodes 115a and 115b.

An operator of an IMS network 105, or of originating IMS network 110, or of terminating IMS network 111 may need to deploy and manage TURN servers 112a and/or 112b and IMS-AGWs/Translation Gateway (TrGW) nodes 115a and/or 115b if their policy is not to always anchor media from first and/or second UEs 101 and/or 103 behind first and/or second NAT devices 108 and/or 109 via IMS-AGW nodes 115a and/or 115b, respectively. However, it is inevitable that current NAT traversal mechanisms can result increased or unnecessary delays for multimedia packets traversing the communication path between the first and second UEs 101 and 103. With the increasing use of high bandwidth multimedia applications, these delays will be unacceptable for time sensitive real-time multimedia traffic such as multimedia streaming, voice, and video conferencing applications.

There is a desire for a NAT traversal mechanism for use within an IMS network that minimises the number of nodes required for NAT traversal within the media communication path of a multimedia session.

SUMMARY

It is an object of the present invention to provide a mechanism for performing ICE based NAT traversal within a communications network in order to minimise or prevent an unnecessary use of nodes or relay servers in the communication path of a media session between endpoints, while also not requiring TURN servers to be deployed.

A first aspect of the present invention provides a method for operating a call originating P-CSCF node for an ICE based NAT traversal in a communications network including an IMS, a first UE and a second UE. A SIP Invite message originating from the first UE is received at the originating P-CSCF node. The SIP Invite message includes candidate address information for the first UE. If a server reflexive candidate address for the first UE is present in the candidate address information for the first UE, and, if a relay candidate address for the first UE is not present in the candidate address information for the first UE, then the SIP Invite message is modified by including in the candidate address information for the first UE a first address provided by an originating IMS Access Gateway node as the relay candidate address for the first UE. The modified SIP Invite message is forwarded to a further IMS node for routing the SIP Invite message towards the second UE. Otherwise, the received SIP Invite message is forwarded to the further IMS node for routing the SIP Invite message towards the second UE. The candidate address information for the first UE is for use by the second UE when performing ICE procedures.

As an option, a SIP Invite response message originating from the second UE is received at the originating P-CSCF node, the SIP Invite response message includes candidate address information for the second UE. If a server reflexive candidate address for the second UE is present in the candidate address information for the second UE, and, if a relay candidate address is not present in the candidate address information for the second UE, then the SIP Invite response message is modified by including in the candidate address information for the second UE a second address provided by the originating IMS AGW node as the relay candidate address for the second UE. The modified SIP Invite response message is forwarded to the first UE. Otherwise, the received SIP Invite response message is forwarded to the first UE. The candidate address information for the second UE is for use by the first UE when performing ICE procedures.

Optionally, the second address of the originating IMS AGW node is determined for use as the relay candidate address. Alternatively or additionally, when the first UE is behind a first NAT device, then the originating IMS AGW node is instructed by the originating P-CSCF node to perform address latching towards the first UE for discovering the transport address the first NAT device uses for the first UE. Alternatively or additionally, when the second UE is behind a second NAT device, the originating IMS AGW node is instructed by the originating P-CSCF node to perform address latching towards the second UE for discovering the transport address the second NAT device uses for the second UE.

Optionally, modifying the received SIP Invite message may further include setting the relay candidate address for the first UE, which is the first address of the originating IMS AGW node, to be the default candidate address. Additionally, an update message can be received from the first or second UE, being the ICE controlling endpoint, the update message indicating that another address candidate other than the relay candidate address for the first UE has been selected for use. The other selected address candidate is set as the default candidate address and the first address of the originating IMS-AGW node is removed, such that the originating IMS-AGW node is removed from the media path between the first and second UE.

According to a second aspect of the invention there is provided a method for operating a terminating call P-CSCF node for ICE based NAT traversal in a communications network including an IMS, a first UE, and a second UE. A SIP Invite message originating from the first UE for the second UE is received at the terminating P-CSCF node, the SIP Invite message includes candidate address information for the first UE. The received SIP Invite message is forwarded towards the second UE. The candidate address information for the first UE is for use by the second UE when performing ICE procedures.

Optionally, in response to the SIP Invite message originating from the first UE, a SIP Invite response message originating from the second UE is received at the terminating P-CSCF node. The SIP Invite response message includes candidate address information for the second UE. If a server reflexive candidate address is present in the candidate address information for the second UE, and if a relay candidate address for the second UE is not present in the candidate address information for the second UE, and if a relay candidate address for the first UE was not present in the associated received SIP Invite message candidate address information for the first UE, then the SIP Invite response message is modified by including in the candidate address information for the second UE a second address of the terminating IMS Access Gateway node as the relay candidate address for the second UE. The modified SIP Invite response message is forwarded to another IMS node for routing the modified SIP Invite response message towards the first UE. Otherwise, the received SIP Invite response message is forwarded to another IMS node for routing the received SIP Invite response message towards the first UE. The candidate address information for the second UE is for use by the first UE when performing ICE procedures.

As an option, the second address of the terminating IMS AGW node for use as the relay candidate address for the second UE is determined. Alternatively or additionally, when the first UE is behind a first NAT device, then the terminating IMS AGW node is instructed by the terminating P-CSCF node to perform address latching towards the first UE for discovering the transport address the first NAT device uses for the first UE. Alternatively or additionally, when the second UE is behind a second NAT device, terminating IMS AGW node is instructed by the terminating P-CSCF node to perform address latching towards the second UE for discovering the transport address the second NAT device uses for the second UE.

As an option, modifying the received SIP Invite response message may further include setting the relay candidate address for the second UE, which includes the second address provided by the terminating IMS AGW, to be the default candidate address. Additionally, an update message may be received from the first or second UE, being the ICE controlling endpoint, the update message indicating that another address candidate other than the relay candidate address for the first or second UE has been selected for use. The another address candidate is set as the default candidate address. The relay candidate address for the first or second UE is removed such that the originating or terminating IMS-AGW node is removed from the media path between the first and second UE.

According to a third aspect of the invention there is provided a network node in a communications network including an IMS, a first UE, and a second UE. The network node includes a receiver, a transmitter, a memory unit, and a processor, the processor being connected to the receiver, to the transmitter, and to the memory unit. The receiver is configured for receiving a SIP Invite message from the first UE for originating a media stream with the second UE. The received SIP Invite message comprising at least a host candidate address and a server reflexive candidate address for the first UE. The processor is configured for modifying the received SIP Invite message to include the address of an originating IMS AGW node as a relay candidate address for the first UE when a relay candidate address for the first UE is not present in the received SIP Invite message. The transmitter is configured for transmitting the modified SIP Invite message to a terminating call P-CSCF node associated with the second UE, the candidate address for the first UE for use by the second UE when performing ICE procedures.

As an option, the receiver is further configured for receiving a SIP Invite response message from the terminating call P-CSCF node, the SIP Invite response message including at least a host candidate address and a server reflexive candidate address for the second UE. The processor is further configured for modifying the received SIP Invite response message to include the originating IMS AGW node as the relay candidate address for the second UE when the relay candidate address for the second UE is not present in the received SIP Invite response message. The transmitter is further configured for transmitting the modified SIP Invite response message to the first UE for use by the first UE when performing the ICE procedure with the second UE.

According to a fourth aspect of the invention there is provided a network node in a communications network including an IMS, a first user UE, a second UE, the network node including a receiver, a transmitter, a memory unit, and a processor, the processor being connected to the receiver, to the transmitter, and to the memory unit. The receiver is configured to receive a SIP Invite message originating from the first UE for the second UE. The SIP Invite message includes candidate address information for the first UE. The transmitter is configured to forward the received SIP Invite message towards the second UE. The candidate address information for the first UE is for use by the second UE when performing ICE procedures.

As an option, the receiver is further configured to receive a SIP Invite response message originating from the second UE in response to the SIP Invite message originating from the first UE. The SIP Invite response message includes candidate address information for the second UE. If a server reflexive candidate address is present in the candidate address information for the second UE, and if a relay candidate address for the second UE is not present in the candidate address information for the second UE, and if a relay candidate address for the first UE was not present in the associated received SIP Invite message candidate address information for the first UE, then the processor is further configured to modify the SIP Invite response message candidate address information for the second UE to include a second address provided by the terminating IMS Access Gateway node as the relay candidate address for the second UE. The transmitter is further configured to forward the modified SIP Invite response message to another IMS node for routing the modified SIP Invite response message towards the first UE. Otherwise, the transmitter is further configured to forward the received SIP Invite response message to another IMS node for routing the received SIP Invite response message towards the first UE. The candidate address information for the second UE is for use by the first UE when performing ICE procedures.

Embodiments of the present invention can provide a relatively simple and efficient mechanism for providing an efficient use of communication resources, for example, minimising the deployment of relay servers such as TURN servers, and providing an efficient throughput for traffic in a media session when NAT traversal is required. This provides a way for operators to provide NAT traversal functions that allow UEs to be configured to select the most optimal communication or media path for traffic of a media session.

As an example, in a communications network when NAT traversal is required, and when a UE supports ICE, and there is no other reason for an IMS-AGW node to be in the communication path than for NAT traversal, then in the absence of relay candidates in the SDP information, the present invention allows the IMS network to add only an IMS-AGW node as relay candidate by manipulating SDP information in the call set-up SIP signalling. This provides the advantage that only an IMS-AGW node will be in the eventually established call path if the ICE mechanism results in the relay candidate being used (e.g. the host and server reflexive candidate addresses did not work).

DETAILED DESCRIPTION

Figure 1A:
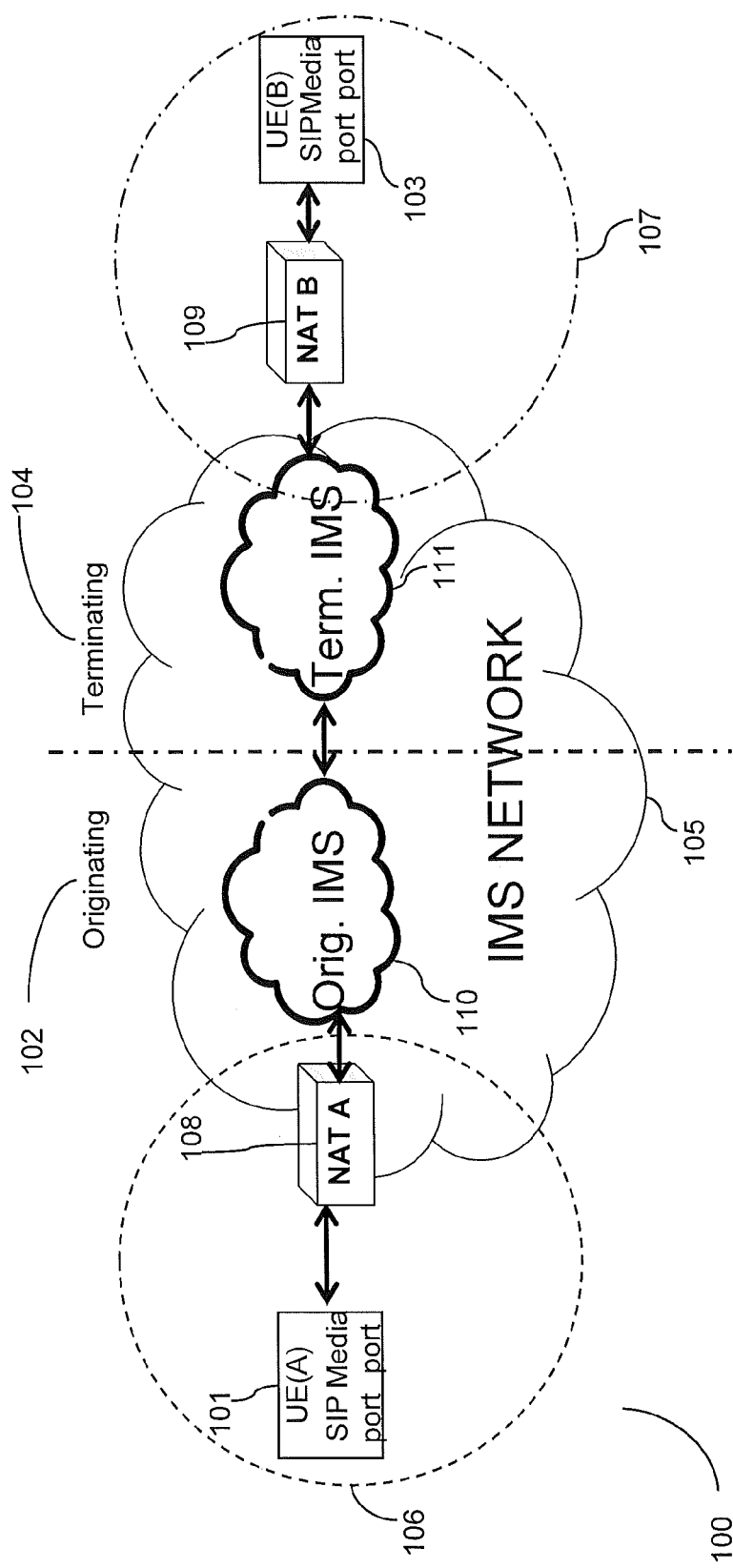
FIG. 1a illustrates schematically a communications network including an originating network and a terminating network.
Figure 1B:
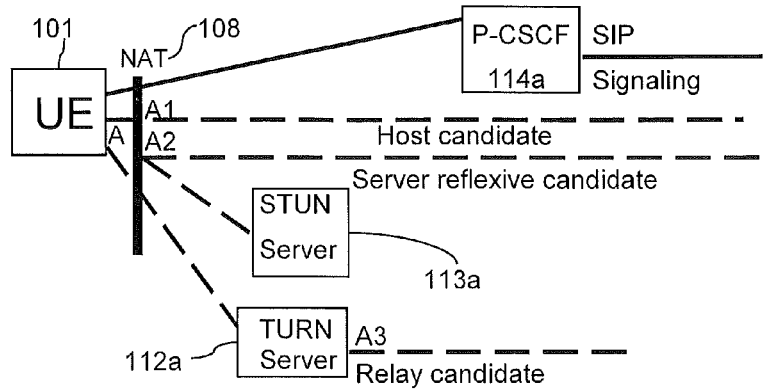
FIG. 1b illustrates schematically a portion of an originating network for use in an example ICE NAT traversal mechanism.
Figure 1C:
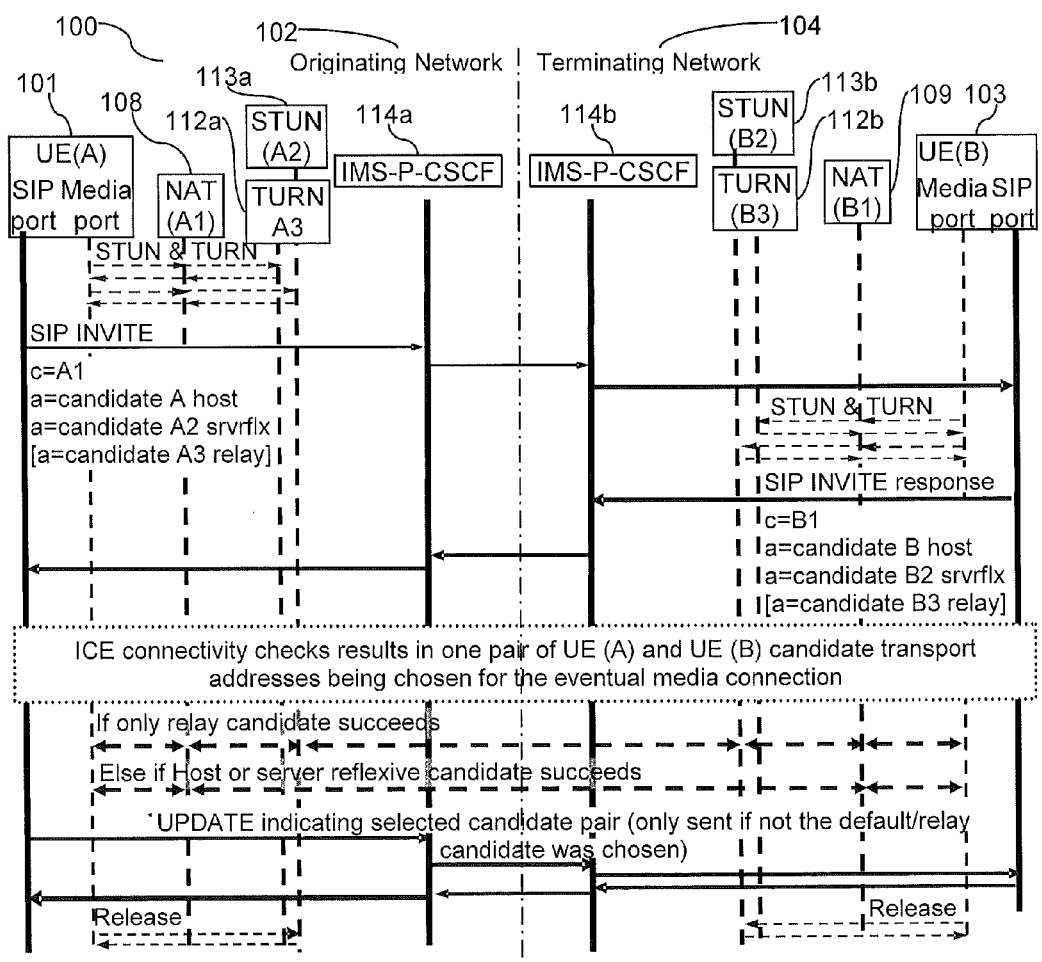
FIG. 1c illustrates a signalling flow diagram for an example ICE NAT traversal mechanism.
Figure 1D:
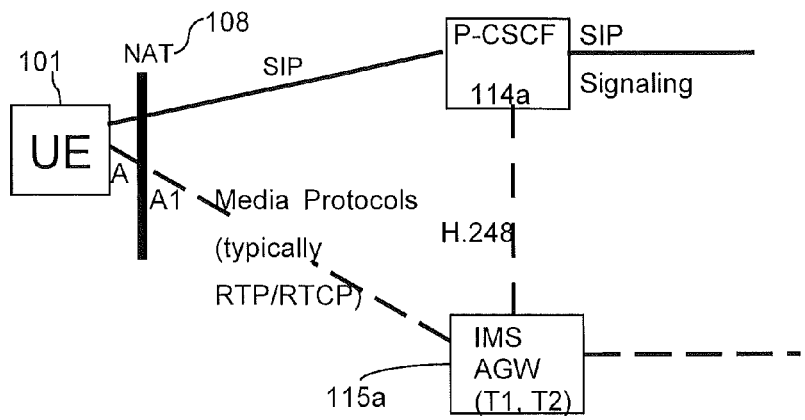
FIG. 1d illustrates schematically a portion of an originating network for use in an example Hosted NAT traversal mechanism.
Figure 1E:
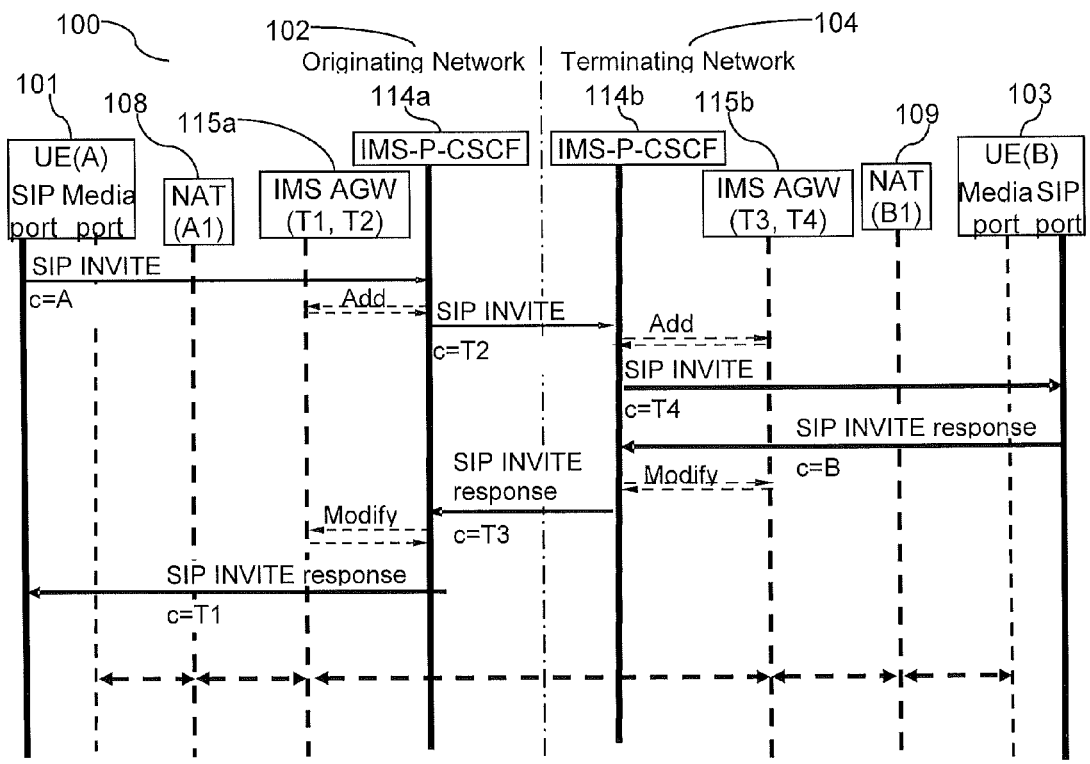
FIG. 1e illustrates a signalling flow diagram for an example Hosted NAT traversal mechanism.
Figure 1F:
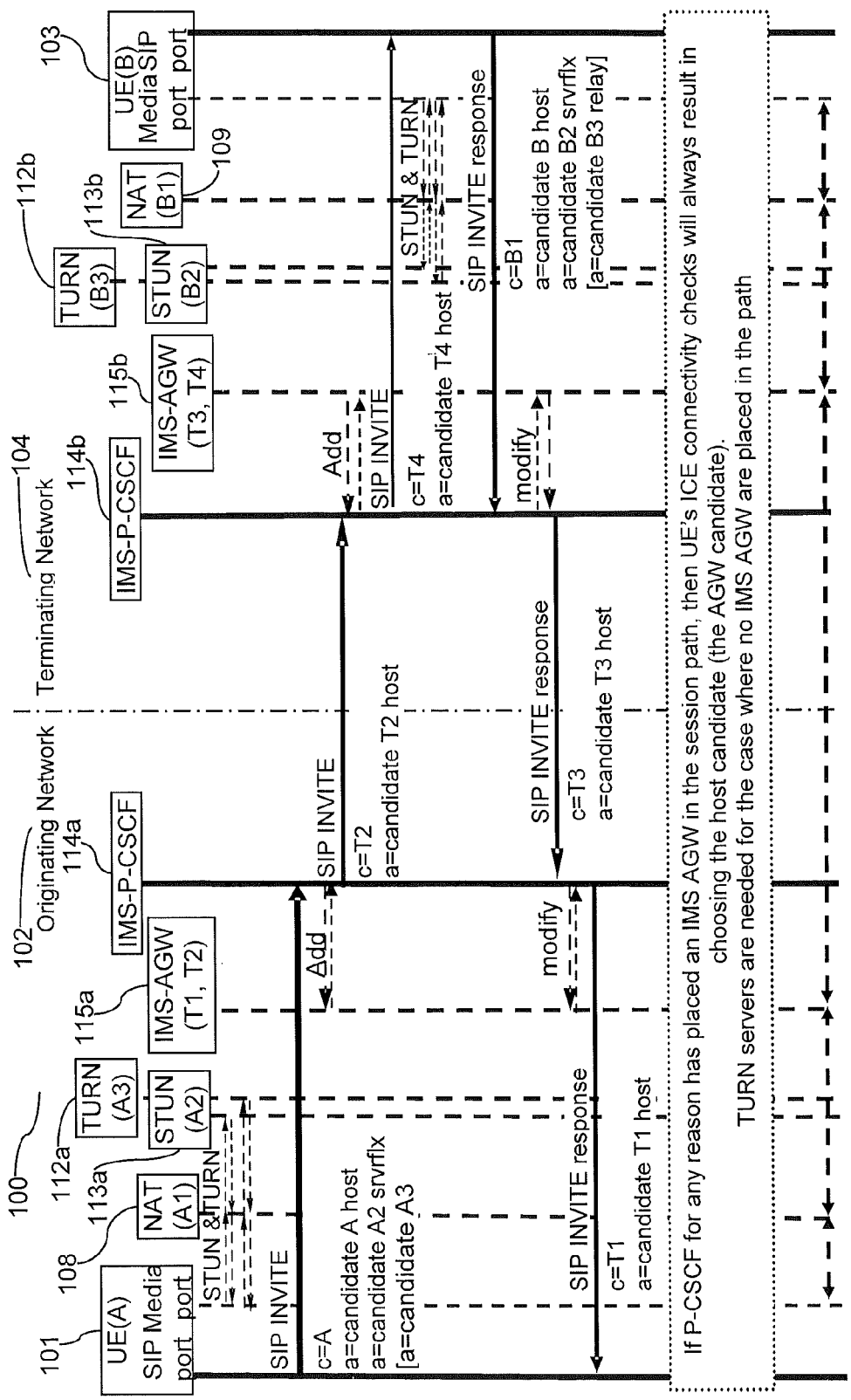
FIG. 1f illustrates a signalling flow diagram for an example Hosted NAT traversal with a UE using the ICE mechanism.

FIGS. 1b and 1c illustrate a first scenario for NAT traversal when the UE supports ICE and the IMS core network does not insert an IMS-AGW node in the media path. The ICE based NAT traversal mechanism results in relay based NAT traversal using TURN servers for those NAT traversal cases where a media relay node is either the only means to achieve NAT traversal or when the other endpoint does not support the ICE mechanism. FIGS. 1d, 1e, and 1f illustrate a second scenario for NAT traversal when the IMS network detects a NAT device located between the UE and the IMS core network. When either A) the UE does not support ICE based NAT traversal (e.g. as illustrated in FIGS. 1d and 1e), or B) the UE supports ICE based NAT traversal, but the IMS-AGW node is already used in the media path (e.g. as illustrated in FIG. 1f), then multiple IMS-AGW nodes are used as media relay nodes in the IMS network, which is commonly used to avoid TURN based NAT traversal.

In order to at least partially overcome the problems described above and herein it is proposed to improve the ICE based NAT traversal mechanism by efficiently using IMS-AGW nodes in place of TURN servers wherever possible. This would allow an IMS operator not to deploy several different types of relay servers or nodes (e.g. TURN servers for supporting the first scenario and IMS-AGW nodes for supporting the second scenario), but to deploy only IMS-AGW nodes. The ICE based mechanism as proposed herein can minimise the number of relay servers, media relay or IMS AGW nodes placed in the media path or communication path further reducing latencies for traffic in a media session between a first UE and a second UE.

As an example, the mechanism can be a method and/or apparatus for operating a call originating P-CSCF node for ICE based NAT traversal when a first UE originates a call with a second UE. The originating call P-CSCF receives a call session request from the first UE, the call session request including candidate address information (e.g. a host candidate address, or a server reflexive candidate address, or a relay candidate address) for the first UE. The candidate addresses may be transport addresses that comprise IP address(es), or IP address(es) and port(s). If a relay candidate address for the first UE is not present in the call session request, the originating P-CSCF node modifies the call session request to include a first address provided by an originating IMS AGW node as the relay candidate address for the first UE (e.g. an a-line i.e. a=candidate first address provided by IMS AGW address relay). This means an originating IMS AGW node is included to perform as a media relay server in a list of transport address candidates for use by the second UE when performing ICE procedures (e.g. ICE connectivity checks). The modified call session request is transmitted to a further IMS node for routing towards the second UE. Otherwise, when a relay candidate is present or when only a host candidate address is present, then the received call session request is forwarded to the further IMS node for routing towards the second UE. The transport address candidates for the first UE in the call session request are used by the second UE when performing ICE procedures.

In addition, a mechanism such as a method and/or apparatus for operating a call terminating P-CSCF node for ICE based NAT traversal when the first UE originates a call with the second UE. The call terminating P-CSCF node receives the call session request from the first UE, the call session request including candidate address information (e.g. a host candidate address, or a server reflexive candidate address, or a relay candidate address) for the first UE. The terminating P-CSCF node forwards the call session request from the first UE to the second UE. The candidate address information for the first UE is used by the second UE in ICE procedures. In response, the second UE gathers candidate address information (e.g. a host candidate address, or a server reflexive candidate address, or a relay candidate address) for the second UE. The terminating P-CSCF node receives a call session response from second UE in response to the second UE receiving the call session request from the first UE. The terminating P-CSCF node will modify the call session response if a relay candidate address for the second UE is not present in the call session response from the second UE and if a relay candidate address for the first UE was not present in the corresponding call session request from the first UE. If these conditions are satisfied, then the terminating P-CSCF node modifies the call session response to include a second address provided by a terminating IMS AGW node as the relay candidate address for the second UE (e.g. an a-line i.e. a=candidate second address provided by IMS AGW address relay). This means a terminating IMS AGW node is included to perform as a media relay server in a list of transport address candidates for use by the first UE when performing ICE procedures (e.g. ICE connectivity checks). The modified call session response is transmitted to a further IMS node for routing towards the first UE. Otherwise, the received call session request is forwarded to the further IMS node for routing towards the first UE. The transport address candidates for the second UE in the call session response are used by the first UE when performing ICE procedures.

In order for the first and second UE to complete their configuration of the media and communication paths, the originating P-CSCF node should receive a call session response from the second UE that is associated with the call session request from the first UE. The originating P-CSCF node may receive a call session response originating from the second UE, where the call session response includes candidate address information for the second UE (e.g. a host candidate address and/or a server reflexive candidate address and/or a relay candidate address for the second UE). If the relay candidate address for the second UE is not present in the received call session response, but there are transport candidate attributes in the response, then the originating call P-CSCF node modifies the candidate address information for the second UE in the received call session response to include a second address provided by the originating IMS AGW node as the relay candidate address for the second UE. The modified call session response is forwarded to the first UE. Otherwise, the received call session response is forwarded to the first UE as is. The first UE uses the candidate address information for the second UE when performing the ICE procedure.

This means that if a relay server is needed for NAT traversal in both directions then the media path between the first and second UE includes only the originating IMS AGW as a relay server, when no other relay servers are present. If a relay server is not needed for NAT traversal in both directions, then the ICE procedure results in that there will be no relay server at all in the communication path eventually established.

When a relay candidate address for the first UE is present in the received call session request, the originating call P-CSCF node forwards the received call session request towards a further IMS node for routing to the second UE. This means that a TURN server has been discovered by the first UE and so the originating P-CSCF should not place a further relay server, e.g. should not place an IMS AGW, into the communication or media path between the first and second UEs. During ICE connectivity checks, if a relay server is required by the first UE then only the TURN server will be included in the communications path, not an IMS AGW as well. When a relay candidate address for the second UE is present in the received call session response, the originating call P-CSCF node forwards the received call session response towards the first UE. This means that a TURN server has been discovered by the second UE and so the originating and/or terminating P-CSCF should not place a further relay server, e.g. an IMS AGW, in the communication or media path between the second and the first UEs. During ICE connectivity checks, if a relay server is required by the second UE then only the TURN server will be included in the communications path between the second and first UE, not an IMS AGW as well.

In addition, when the call session request and call session response are modified by the originating IMS AGW node to include a relay candidate, the relay candidate address (e.g. the address of the originating IMS AGW) is set to be the default candidate address. When the ICE connectivity checks have completed between the first and second UEs, the ICE controlling endpoint (either the first or second UE) may transmit an update message to the originating P-CSCF node and/or the terminating P-CSCF node, the update message indicating the candidate pair of addresses that were selected by the first and second UEs for configuring the media or communication path between the first and second UEs. If the default candidate address is not included in the candidate pair of addresses, then the originating P-CSCF may remove or release the originating IMS-AGW from the media path between the first and second UE.

The above-described example solution according to the invention used call session request and response messages. Although the following example solutions according to the invention are described with respect to the SIP signalling protocol and SDP offer/answer protocols and models, it is to be appreciated that other signalling protocols or call session protocols and session description protocols may be used in place of the SIP signalling and SDP protocols when a first UE originates a call with a second UE.

Figure 2A:
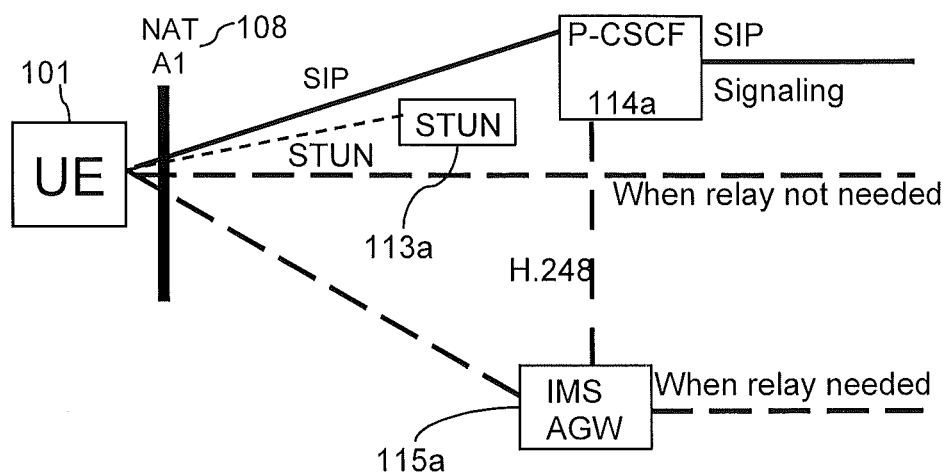
FIG. 2a illustrates schematically a portion of an originating network for use in an example solution for operating an originating or terminating IMS P-CSCF node for ICE based NAT traversal according to the invention.
Figure 2B:
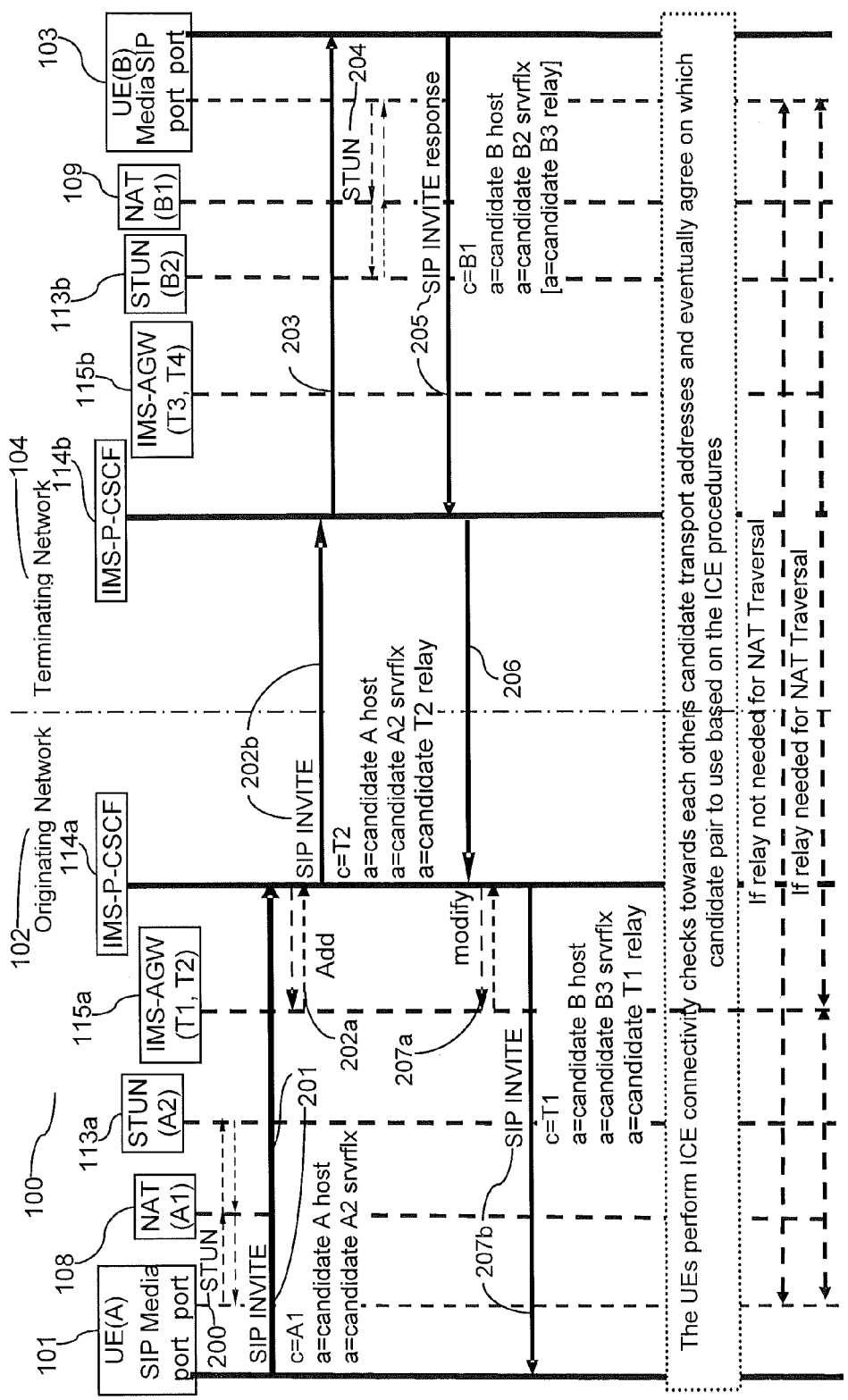
FIG. 2b illustrates a signalling flow diagram for another example solution for operating an originating or terminating IMS P-CSCF node for ICE based NAT traversal according to the invention.

FIGS. 2a and 2b are schematic and signalling flow diagrams illustrating an example solution according to the invention for operating originating and terminating P-CSCF nodes 114a and 114b for ICE based NAT traversal in communications network 100. The reference numerals for FIGS. 1a to 1e will be reused for the same or similar network elements. This example solution eliminates the need for, but does not exclude the use of, TURN servers when using ICE based NAT traversal in communications network 100 in an IMS network environment.

When the first UE 101 originates a call towards a second UE 103, an operator may desire the media connection between the first and second UEs 101 and 103 not to go through a relay server unless this is the only way to achieve NAT traversal. If there are no TURN servers available to be contacted by an ICE compliant UE, such as first UE 101 and/or second UE 103 that is behind a NAT device 108 and/or 109, respectively, the IMS network 105 will be configured, e.g. using originating P-CSCF node 114a and/or terminating P-CSCF node 114b, to use an IMS-AGW node 115a and/or 115b as a substitute relay server where a TURN server may be used.

The ICE procedures at the first and second UEs 101 and 103 will allow the first and second UEs 101 and 103 to select the optimal media path such that in situations where NAT traversal can be achieved without a media relay then no IMS-AGW node 115a and/or 115b will be used. An IMS network operator would never need to deploy TURN servers. Instead, based on the example solution as described below, the operator could deploy IMS-AGW nodes 115a/115b and configure the originating and terminating P-CSCF nodes 114a/114b to efficiently employ the use of IMS-AGW nodes 115a/115b for NAT traversal sparingly to minimize the number of relay servers within the media path. Although the originating and terminating P-CSCF nodes 114a/115b may use the H.248 Gateway networking protocol when communicating with the IMS AGW nodes 115a/115b, it is to be appreciated that any network protocol may be used to communicate with nodes having IMS AGW functionality.

Referring to FIGS. 2a and 2b, the first UE 101 is assumed to be an ICE compliant UE 101 behind the first NAT device 108 of the originating network 102. The first and second UEs 101 and 103 include a SIP port and a media port, the SIP port is used for SIP signaling represented by solid arrows, and the media port is the interface to the media bearers etc represented by dashed arrows. Prior to originating a call or initiating a multimedia session and setting up a multimedia stream, in step 200, the first UE interacts with a first STUN server 113a to determine the transport address(es) that the first NAT device 108 of originating network 102 would allocate for the media on its public network side when the first NAT device 108 does not perform address or port restrictive filtering on packets towards the first UE 101. A transport address may include data representative of an IP address or data representative of an IP address and port. Should the first UE 101 also find a TURN server (not shown), the first UE 101 will then interact with the TURN server to set up a tunnel between the first UE 101 and the TURN server, which will allocate relay transport address(es) for the media to use on the public network side of the TURN server. In this case, the first UE 101 does not find a TURN server and so only discovers at least one server reflexive candidate transport address received in answer from the STUN server 113a.

In step 201, the first UE 101 uses SIP signaling to originate a call towards the second UE 101 by sending a SIP INVITE request message with an SDP offer to the originating P-CSCF node 114a for forwarding towards second UE 103. The SIP INVITE request message with the SDP offer includes candidate address information for the first UE. The candidate address information includes at least the host candidate address of the first UE (e.g. the IP address and/or port information A), a server reflexive candidate address for the first UE (e.g. IP address and/or port information A2) received in the answer from the STUN server), and optionally a relay candidate address for the first UE received from a TURN server (not shown), should there be one. In this example, a TURN server is not found by the first UE 101, so there will not be a relay candidate address included in the candidate address information.

As shown in FIG. 2b, because first UE 101 is behind first NAT device 108, the candidate address information may include the list of SDP attributes c=A1; a=candidate A host; and a=candidate A2 srvrflx, where A1 is the transport address provided by NAT device 108 in relation to the host transport address, A is the host transport address, and A2 is the transport address provided by the STUN server 113a.

Referring to FIGS. 1a to 1e, 3GPP TS 24.229 requires that an originating/terminating IMS P-CSCF node 114a/114b receiving a SIP INVITE request message from a UE, when the first UE 101 is behind first NAT device 108 and when the SDP offer for a media component contains ICE candidate attributes (e.g. the above SIP INVITE request message), then the P-CSCF nodes 114a/114b may place IMS-AGW nodes 115a/115b in the media path. This is generally determined by locally configured policies. However, if there are no reasons other than Hosted NAT traversal for the originating/terminating P-CSCF node 114a/114b to place an IMS-AGW node 115a/115b in the media path, then the originating/terminating P-CSCF node 114a/114b may choose either to A) not to place an IMS-AGW node 115a/115b in the media path and instead rely ICE with STUN and TURN servers 113a/113b and 112a/112b, respectively, as in FIG. 1c, or B) the originating/terminating P-CSCF node 114a/114b may place IMS-AGW nodes 115a/115b in the media path and command them to perform hosted NAT traversal as in FIG. 1e. This causes media to always be routed through an IMS-AGW nodes 115a/115b including any TURN and STUN servers 112a/112b and 113a/113b that may be available.

Referring to FIGS. 2a and 2b, an advantage provided by the example solution for ICE based NAT traversal is that the number of IMS-AGW nodes 115a/115b acting as relay servers is greatly minimized, even when no TURN servers are available to the first UE 101. The example solution ensures that the option to use relay servers is maintained, and in most cases reduces the number of IMS-AGW nodes 115a/115b and relay servers that are needed in the media path between the first and second UEs for ICE based NAT traversal.

Referring to FIG. 2b, on receiving the SIP INVITE request message from the first UE 101, the originating P-CSCF node 114a will check the candidate address information to determine whether a relay candidate address for the first UE 101 is present. If a server reflexive candidate address is present, then this means that the first UE 101 is behind first NAT device 108, and if a relay candidate address is not present in the candidate address information for the first UE 101, then step 202a is performed. In step 202a, the originating P-CSCF node 114a (depending on other locally configured policies) adds or places an originating IMS-AGW node 115a in the media path through manipulating the transport address information in c= and m= and a=lines of the SDP offer. This can be achieved by having a relay candidate address corresponding to a first address provided by the originating IMS-AGW node 115a being added to the existing candidates in the SDP offer.

The candidate address information in the SIP INVITE request message is modified to include the first address provided by the originating IMS-AGW node 115a as a relay candidate address. For example, in FIG. 2b, the candidate address information is modified to include the SDP attribute, a=candidate T2 relay, in which T2 is a transport address provided by originating IMS AGW node 115a as the relay candidate address. The relay candidate address may also be set as the default candidate. Alternatively, the originating P-CSCF node 114a may trust that NAT traversal will be achieved without a relay server and therefore not place an IMS-AGW node 115a in the path, which may not be guaranteed.

Once the originating IMS AGW node 115a has been added, the originating P-CSCF node 114a may also instruct or command the originating IMS-AGW node 115a to perform address latching towards the first UE 101 and/or the second UE 103. This is because the originating P-CSCF node 114a may not know the address (IP address and/or port) to which the originating IMS AGW node 115a will relay media packets. So IMS AGW node 115a will need to wait for media packets to arrive and inspect the source address and use that address to relay media that is to be relayed in the other direction. In step 202b, the originating P-CSCF node 114a forwards the modified SIP INVITE request message to further IMS nodes in IMS network 105 for routing towards the second UE 103.

If it is determined that a relay candidate address is present in the candidate information for the received SIP INVITE request message, i.e. a media component of the SDP offer contains a TURN server relay candidate, then the originating P-CSCF node 114a will not invoke hosted NAT traversal with the originating IMS-AGW node 115a for the media component. That is the received SIP INVITE request message is unmodified. This means originating IMS AGW node 115a will not be placed in the media path. In this case, the originating P-CSCF node 114a forwards the received SIP INVITE request message (unmodified SIP INVITE request message) from UE 101 to further IMS nodes in IMS network 105 for routing towards the second UE 103.

When the terminating call side P-CSCF node 114b, referred to as the terminating P-CSCF node 114b, receives a SIP INVITE request message originating from the first UE 101. This may be the modified SIP INVITE message from the first UE as described above or the unmodified SIP INVITE message from the first UE as described above. The terminating P-CSCF node 114b performs a check on the received SIP INVITE message to determine whether a relay candidate address is present in the SDP offer. Due to the presence of the relay candidate address in either the modified or unmodified SIP request message, the terminating P-CSCF node 114b does not place an IMS AGW node 115b in the path. Instead, in step 203, the terminating P-CSCF node 114b makes note that the SIP INVITE request message from first UE 101 had a relay candidate address and forwards the received SIP INVITE request message to the second UE 103 in the terminating network 104. Should the SIP INVITE message from the first UE not include a relay candidate address, the terminating P-CSCF node 114b forwards the received SIP INVITE message towards the second UE 103.

On receiving the SIP INVITE request message, the second UE 103 can use the candidate address information for the first UE 101 when performing ICE procedures. In step 204, after receiving the SIP INVITE request message originating from the first UE 101, the second UE 103 performs candidate transport address discovery in the terminating network 104 with STUN server 113b (and if present a TURN server) in a similar fashion as the first UE 101 performed in step 200 in the originating network 102.

In step 205, in response to the SIP INVITE request message from the first UE 101, the second UE 103 sends a SIP INVITE response message with an SDP answer to the terminating P-CSCF node 114b. The SDP answer includes candidate address information for the second UE 103. As seen in FIG. 2b, the candidate address information includes at least the host candidate transport address of the second UE 103 (e.g. IP address and/or port information B), a server reflexive candidate transport address for the second UE 103 (e.g. IP address and/or port information B2) received in the answer from the STUN server 113b, and optionally a relay transport address (e.g. optional IP address and/or port information B3) for the second UE received from a TURN server (not shown). In FIG. 2b, an attribute in square brackets is considered optional.

In the case no TURN server is found then no relay transport address is included in the candidate address information for the second UE 103. As shown in FIG. 2b, because the second UE 103 is behind a second NAT device 109 in the terminating network 104, the candidate address information may include the list of SDP attributes c=B1 (e.g. the public address NAT device 109 uses for the second UE 103); a=candidate B host (actual host address of second UE 103); and a=candidate B2 srvrflx (server reflexive address provided by STUN server 113b), where B1 is the transport address provided by NAT device 109, B is the host transport address for the second UE 103, and B2 is the transport address provided to second UE 103 by the STUN server 113b.

When the terminating P-CSCF node 114b receives the SIP INVITE response message with the SDP answer, the terminating P-CSCF node 114b determines whether a relay candidate address is present in the SDP answer, which, in this example, is not present. If it is determined that a relay candidate address for the second UE 103 is not present in the candidate address information for the second UE 103, then the terminating P-CSCF node 114b further determines whether the SIP INVITE request message associated with the SIP INVITE response message (e.g. the modified/unmodified SIP INVITE request message originating from the first UE 101) had a relay address candidate for the first UE 101. If it does determine that the SIP INVITE request message from UE 101 associated with the SIP INVITE response message had a relay address candidate for the first UE 101, then, in step 206, the terminating P-CSCF node 114*b* forwards the received SIP INVITE response message to another IMS node in the IMS network 105 for routing to the first UE 101. In this example, the terminating P-CSCF node 114*b* received the modified SIP INVITE request message from first UE 101, which had a relay candidate address (e.g. transport address T2), so in step 206, the terminating P-CSCF node 114*b* forwards the received SIP INVITE response message to another IMS node for routing to the first UE 101. This means that a terminating IMS AGW node (not shown) is not placed in the path.

However, if the terminating P-CSCF node 114*b* does determine that the SIP INVITE request message originating from the first UE 101 did not have a relay address candidate for the first UE 101, then, the terminating P-CSCF node 114*b* adds or places a terminating IMS AGW node 115*b* (not shown) into the path by including a second address provided by the terminating IMS AGW node 115*b* as a relay candidate address into the candidate address information for the second UE 103, which modifies the SDP answer in the received SIP INVITE response message from the second UE 103. The terminating P-CSCF node 114*b* forwards the modified SIP INVITE response message to another IMS node in the IMS network 105 for routing towards the first UE 101.

In addition, if a relay candidate address for the second UE 103 is present in the received SIP INVITE response message, then, in step 206, the terminating P-CSCF node 114*b* forwards the received SIP INVITE response message from the second UE 103 to another IMS node in the IMS network 105 for routing towards the first UE 101.

On receiving the SIP INVITE response message with SDP answer originating from the second UE 103, the originating P-CSCF node 114*a* determines whether the second UE 101 is behind a NAT device and whether a relay address candidate for the second UE 103 is present in the candidate address information for the second UE 103 in the SIP INVITE response message. If it is determined that the candidate address information includes a server reflexive candidate address for the second UE 103, then the second UE 103 is behind a NAT device. The originating P-CSCF node 114*a* then determines if a reflexive candidate address is present. If it is determined that a reflexive candidate address is not present in the candidate attributes of the candidate address information, then, in step 207*a*, the originating P-CSCF node 114*a* modifies the candidate information for the second UE 103 by adding a second address (e.g. T1) provided by the IMS-AGW node 115*a* as a relay candidate address for the second UE 103. In this example, the SDP answer of the SIP Invite response message is modified such that the attribute c-line is replaced by c=T1 and the relay candidate address is included by a-line, a=candidate T1 relay. In step 207*b*, the originating P-CSCF node 114*a* forwards the modified SIP INVITE response message to the first UE 101. The first UE 101 uses the candidate address information for the second UE 103 when performing ICE procedures.

If it is determined that there a relay candidate address for the second UE 103 is present in the candidate address information for the second UE 103, then the received SIP INVITE response message is forwarded to the first UE 101. That is, no IMS AGW node 115*a* type relay address candidate is added.

If the SDP answer did contain a relay address candidate then the IMS AGW node 115*a* will just be visible as a relay address candidate in the SDP offer, not in the SDP answer. The ICE procedures performed by the first UE 101 will then during the ICE connectivity check phase discover the IMS-AGW node 115*a* as a peer candidate.

Once the first and second UE 101 and 103 has the candidate address information associated with the second and first UE 103 and 101, respectively, then these UEs 101 and 103 can, in full accordance with ICE procedures, exchange ICE connectivity checks with each other to determine the most optimal candidate pair that works for the multimedia session. If it is determined by the ICE connectivity checks that a relay server is not needed for NAT traversal, then as illustrated in FIG. 2*b*, the most optimal candidate pair is chosen allowing end to end communication between first and second UEs 101 and 103. If it is determined by the ICE connectivity checks that a relay server is needed for NAT traversal, then, if IMS AGW node 115*a* was included in the path as outlined in FIG. 2*b*, then only the IMS AGW node 115*a* will be included into media path. The media delay has been minimized by the efficient use of communications resources such as media relay resources.

In any event, the first and second UEs 101 and 103, also called end-points, will eventually select an optimal working candidate pair (a set of addresses). If the eventually selected candidate pair was not the default candidate, i.e. the address provided by IMS-AGW 115*a* as the default relay candidate address, then the ICE controlling end point will send an SDP update message to the originating P-CSCF 114*a*, the SDP update message indicating which candidate pair was selected. The originating P-CSCF node 114*a* may then de-allocate the IMS-AGW node 115*a* resource, as this will not be used.

In cases where there is no IMS-AGW node 115*a* required in the path for any other reason than for NAT traversal and the NAT traversal can be done without a relay server, then if both endpoints in a session support the ICE based mechanism for NAT traversal based on the above solution, the session media will then go along the shortest path instead of always being routed via a relay server. This minimises media delay for those cases, and efficiently uses communications resources by minimising network bandwidth and media relay (IMS-AGW nodes 115*a*/115*b*) resources.

Figure 3A:
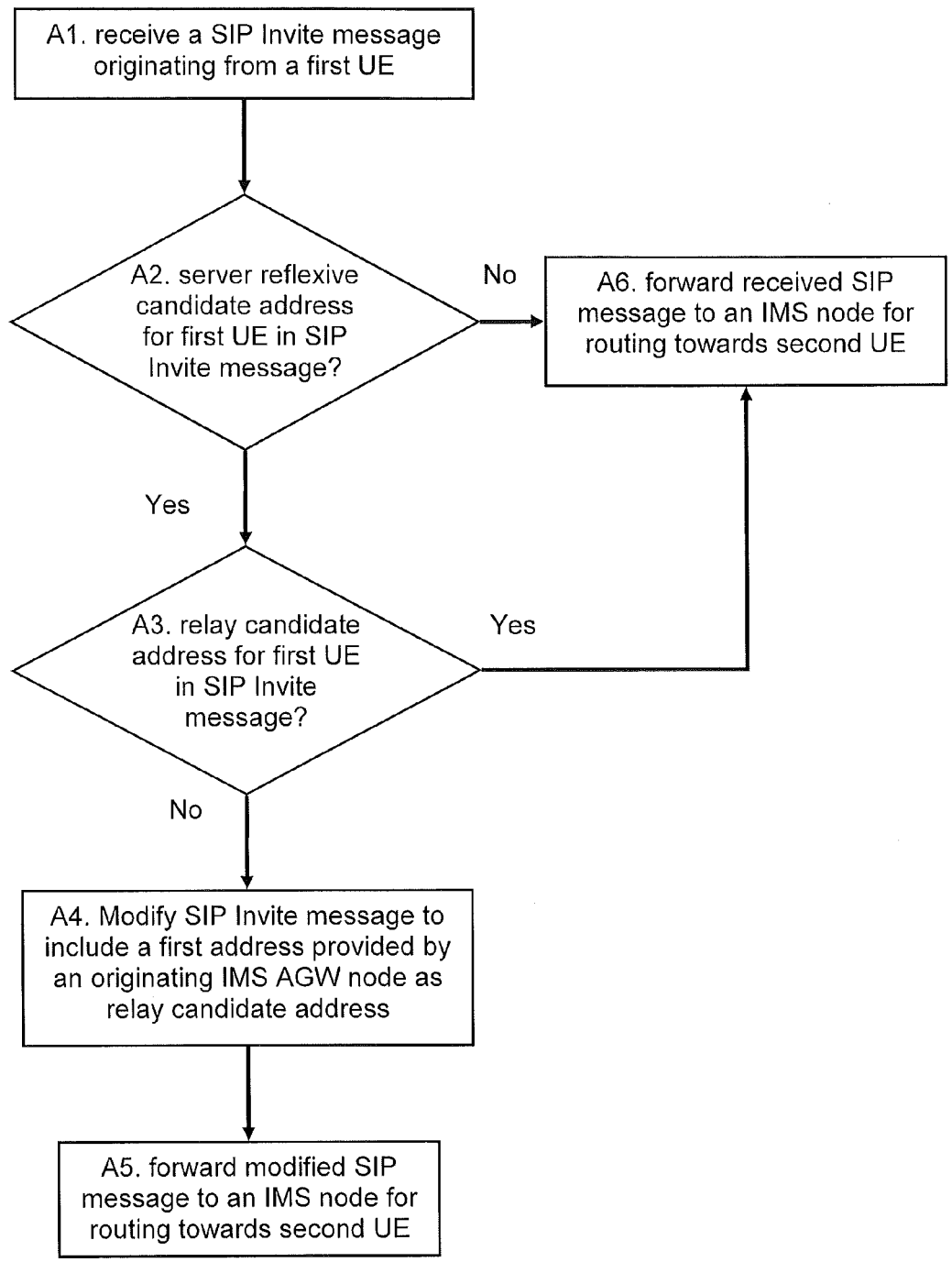
FIG. 3a illustrates a flow diagram for an example solution for operating an originating IMS P-CSCF node for ICE based NAT traversal according to the invention.

FIG. 3*a* illustrates a flow diagram for another example solution for operating an originating IMS P-CSCF node for ICE based NAT traversal according to the invention. A communications network including an IMS, a first UE, and a second UE, is assumed in which the first UE originates a call towards the second UE. The process steps performed by the originating IMS P-CSCF node include:

A1. Receiving a SIP Invite message originating from the first UE. The SIP Invite message includes candidate address information for the first UE. The candidate address information may include at least one transport address from the group of a host candidate address, a server reflexive address, and a relay candidate address. Proceed to A2.

A2. Determining whether a server reflexive candidate address for the first UE is present in the candidate address information for the first UE. If a server reflexive candidate address for the first UE is present in the candidate address information for the first UE, then the process proceeds to step A3. Otherwise, if a server reflexive candidate address for the first UE is not present in the candidate address information for the first UE, then the process proceeds to step A6.

A3. Determining whether a relay candidate address for the first UE is not present in the candidate address information for the first UE. If a relay candidate address for the first UE is not present in the candidate address information for the first UE, then the process proceeds to step A4. Otherwise, if a relay candidate address for the first UE is present in the candidate address information for the first UE, then the process proceeds to step A6.

A4. Modifying the SIP Invite message by including in the candidate address information for the first UE an first address provided by the originating IMS Access Gateway node as the relay candidate address for the first UE. Proceed to step A5.

A5. Forwarding the modified SIP Invite message to a further IMS node for routing the SIP Invite message towards the second UE.

A6. Forwarding the received SIP Invite message to the further IMS node for routing the SIP Invite message towards the second UE The candidate address information for the first UE is for use by the second UE when performing ICE procedures.

The above process may then wait for receipt of a further SIP Invite message from the first UE or any other UE, where it then performs the above steps in relation to the further SIP Invite message. Alternatively, the process may proceed to that outlined in FIG. 3b, as the originating P-CSCF node may then expect a SIP Invite response message originating from the second UE, the SIP Invite response message being associated with the SIP Invite message originating from the first UE.

Figure 3B:
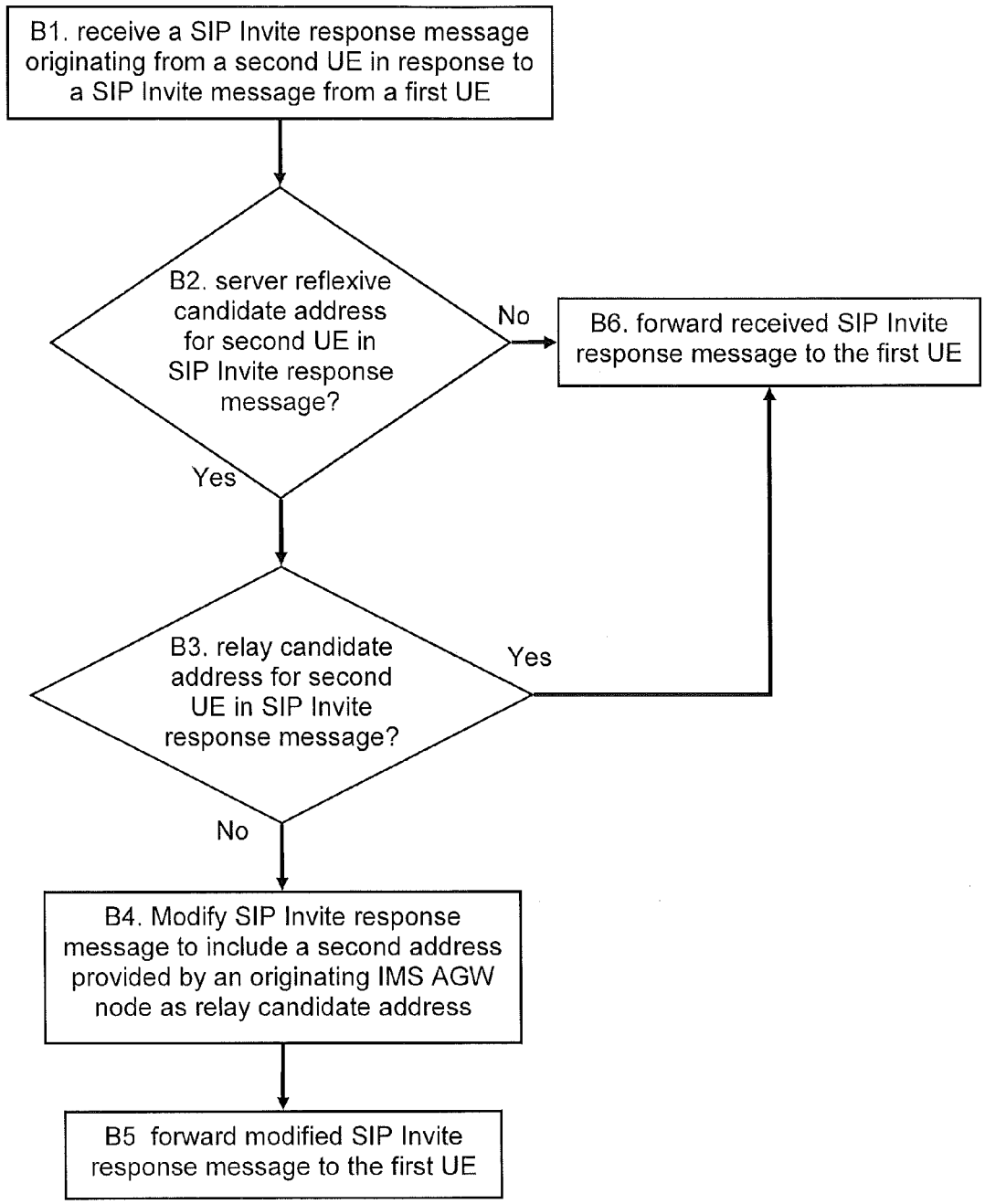
FIG. 3b illustrates a flow diagram for another example solution for operating an originating IMS P-CSCF node for ICE based NAT traversal according to the invention.

FIG. 3b illustrates a flow diagram for another example solution for operating an originating IMS P-CSCF node for ICE based NAT traversal according to the invention. A communications network including an IMS, a first UE, and a second UE, is assumed in which the first UE has originated a call towards the second UE. The process steps performed by the originating IMS P-CSCF node include:

B1. Receiving a SIP Invite response message originating from the second UE, in response to a SIP Invite message from the first UE. The SIP Invite response message includes candidate address information for the second UE. Proceed to B2.

B2. Determining whether a server reflexive candidate address for the second UE is present in the candidate address information for the second UE. If a server reflexive candidate address for the second UE is present in the candidate address information for the second UE, then proceed to B3. Otherwise, if a server reflexive candidate address for the second UE is not present in the candidate address information for the second UE, then proceed to B6.

B3. Determining whether a relay candidate address for the second UE is not present in the candidate address information for the second UE. If a relay candidate address for the second UE is present in the candidate address information for the second UE, then proceed to B6. Otherwise, if a relay candidate address for the second UE is not present in the candidate address information for the second UE, then proceed to B4.

B4. Modifying the SIP Invite response message by including into the candidate address information for the second UE a second address provided by the originating IMS AGW node as the relay candidate address for the second UE. Proceed to B5.

B5. Forwarding the modified SIP Invite response message to the first UE.

B6. Forwarding the received SIP Invite response message to the first UE.

The candidate address information for the second UE is for use by the first UE when performing ICE procedures.

Figure 3C:
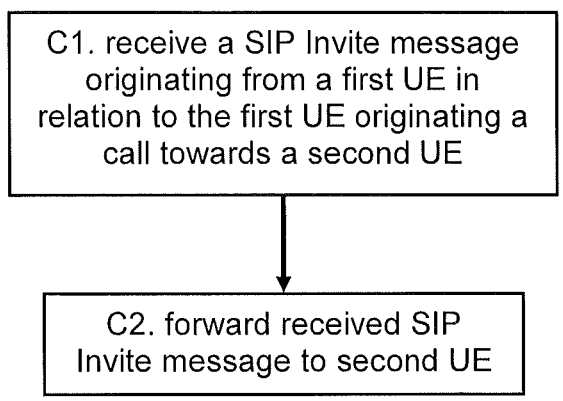
FIG. 3c illustrates a flow diagram for an example solution for operating a terminating IMS P-CSCF node for ICE based NAT traversal according to the invention.

FIG. 3c illustrates a flow diagram for another example solution for operating a terminating IMS P-CSCF node for ICE based NAT traversal according to the invention. A communications network including an IMS, a first UE, and a second UE, is assumed in which the first UE originates a call towards the second UE. The process steps performed by the terminating IMS P-CSCF node include:

C1. Receiving a SIP Invite message originating from the first UE in relation to the first UE originating a call towards a second UE. The SIP Invite message includes candidate address information for the first UE. Proceed to step C2.

C2. Forwarding the received SIP Invite message towards the second UE.

The candidate address information for the first UE is for use by the second UE when performing ICE procedures.

The above process may then wait for receipt of further SIP Invite messages originating from the first UE or any other UE, where it then performs the above steps in relation to the further SIP Invite message(s). Alternatively, the process may proceed to that outlined in FIG. 3d, as the terminating P-CSCF node may then expect a SIP Invite response message originating from the second UE, the SIP Invite response message being associated with the SIP Invite message originating from the first UE.

Figure 3D:
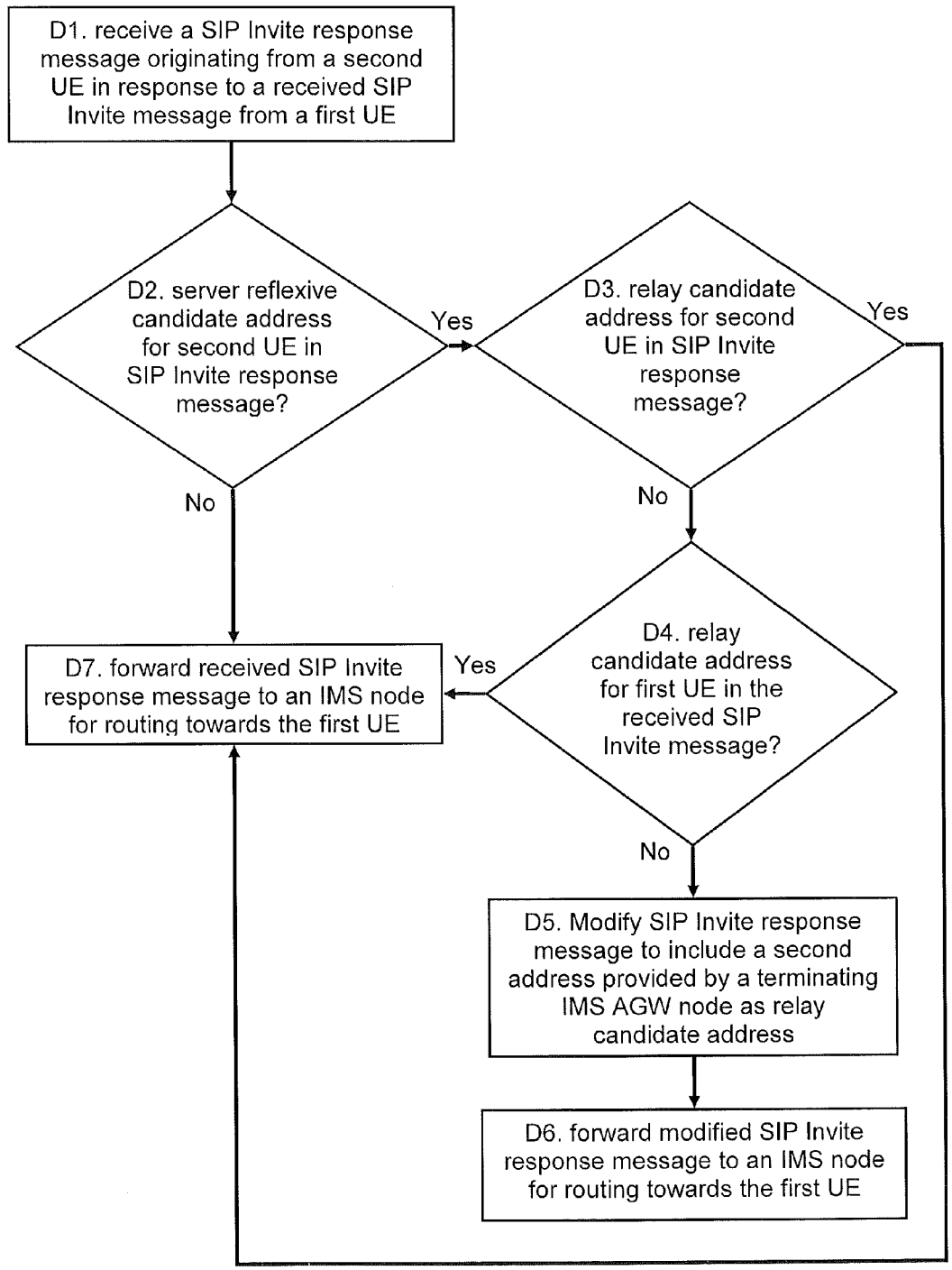
FIG. 3d illustrates a flow diagram for another example solution for operating a terminating IMS P-CSCF node for ICE based NAT traversal according to the invention.

FIG. 3d illustrates a flow diagram for another example solution for operating a terminating IMS P-CSCF node for ICE based NAT traversal according to the invention. A communications network including an IMS, a first UE, and a second UE, is assumed in which the first UE has originated a call towards the second UE. The process steps performed by the terminating IMS P-CSCF node include:

D1. Receiving a SIP Invite response message originating from the second UE in response to a received SIP Invite message originating from the first UE. The SIP Invite response message includes candidate address information for the second UE. Proceed to D2.

D2. Determining whether a server reflexive candidate address is not present in the candidate address information for the second UE. If a server reflexive candidate address is not present in the candidate address information for the second UE, then proceed to D7. Otherwise, if a server reflexive candidate address is present in the candidate address information for the second UE, then proceed to D3.

D3. Determining whether a relay candidate address for the second UE is present in the candidate address information for the second UE. If a relay candidate address for the second UE is present in the candidate address information for the second UE, then proceed to D7. Otherwise, if a relay candidate address for the second UE is not present in the candidate address information for the second UE, then proceed to D4.

D4. Determining whether a relay candidate address for the first UE is present in the candidate address information for the first UE from the received SIP Invite message. If a relay candidate address for the first UE is present in the candidate address information for the first UE from the received SIP Invite message, then proceed to D7. Otherwise, if a relay candidate address for the first UE is not present in the candidate address information for the first UE from the received SIP Invite message then proceed to D5.

D5. Modifying the SIP Invite response message by including in the candidate address information for the second UE a second address of the terminating IMS Access Gateway node as the relay candidate address for the second UE. Proceed to D6.

D6. Forwarding the modified SIP Invite response message to another IMS node for routing the modified SIP Invite response message towards the first UE.

D7. Forwarding the received SIP Invite response message to another IMS node for routing the received SIP Invite response message towards the first UE.

The candidate address information for the second UE is for use by the first UE when performing ICE procedures.

Figures 4, 5:
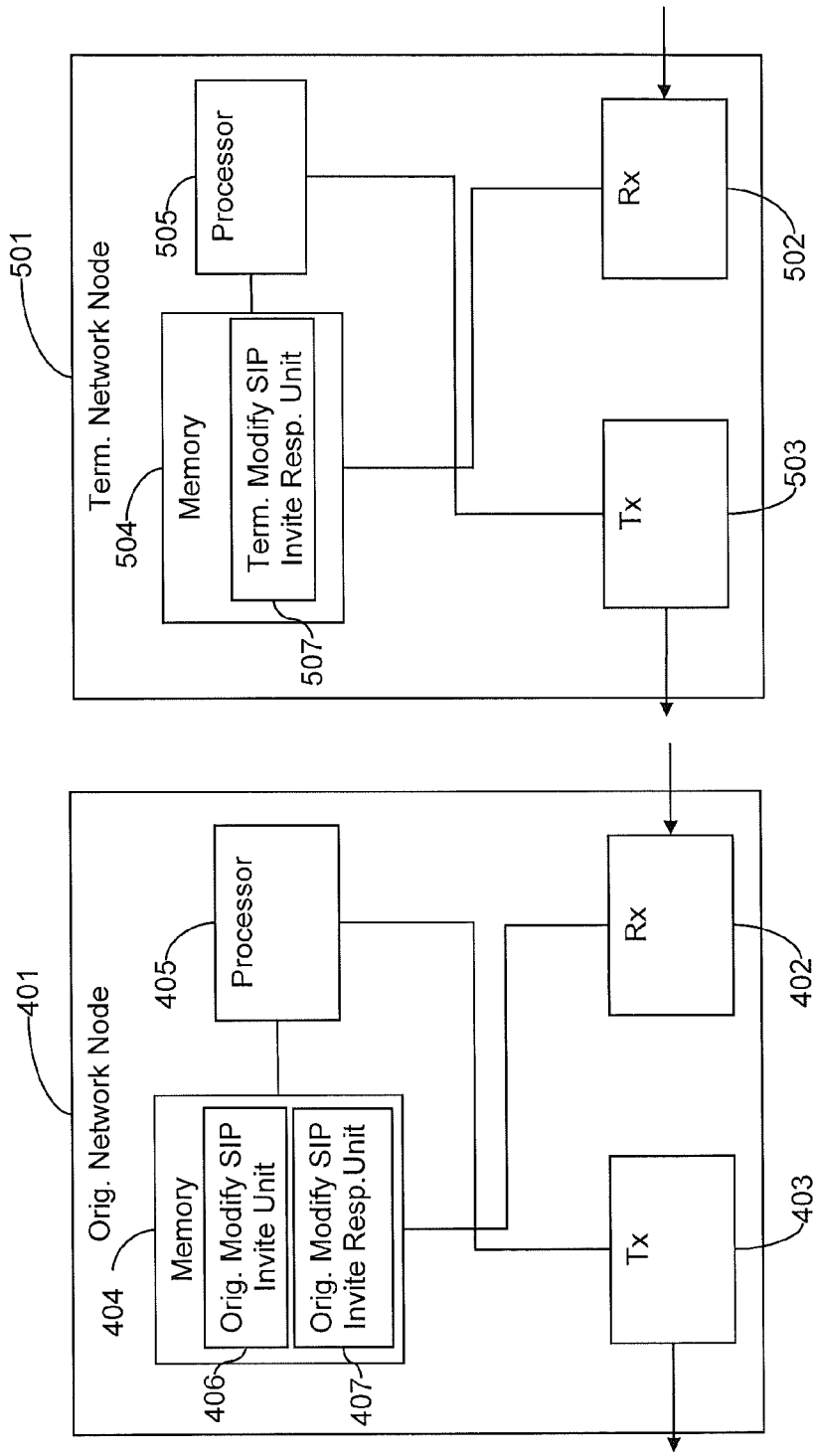
FIG. 4 illustrates a schematic diagram for an example of a network node according to the invention.
FIG. 5 illustrates a schematic diagram for another example of a network node according to the invention.

FIG. 4 illustrates a schematic diagram for an example of a network node 401 with P-CSCF functionality (e.g. IMS P-CSCF node 114a and/or 114b) for use in implementing the methods, processes and/or the solutions according to the invention associated with an originating side of a call originated by a first UE towards a second UE. The network node 401 can be implemented as a combination of computer hardware and software, and can be configured to operate as an originating P-CSCF node in accordance with the solutions described above. When operating as an originating P-CSCF node, the network node 401 includes a receiver 402, a transmitter 403, a memory 404 and a processor 405, which are connected together. The memory 404 stores the various programs/executable files that are implemented by the processor 405 and also provides a storage unit for any required data e.g. data representative of transport addresses associated with one or more UEs. The programs/executable files stored in the memory 404, and implemented by processor 405, include one or more of, but are not limited to, an originating modify SIP Invite unit 406 (e.g. orig. modify SIP Invite unit) and an originating modify SIP Invite response unit 407 (e.g. orig. modify SIP Invite response unit).

The originating modify SIP Invite unit 406 includes program instructions for determining, on the network node 401 receiving a SIP Invite message originating from a first UE (the SIP Invite message including an SDP offer with candidate address information for the first UE), whether a server reflexive candidate address for a first UE is present in the candidate address information for the first UE and whether a relay candidate address for the first UE is not present in the candidate address information for the first UE. When both these conditions are fulfilled, then the candidate address information for the first UE of the SIP Invite message is modified to include a first address provided by an originating IMS Access Gateway node as the relay candidate address for the first UE.

The originating SIP Invite response unit 407 includes program instructions for determining, on receiving a SIP Invite response message originating from the second UE (the SIP Invite response message including candidate address information for the second UE), whether a server reflexive candidate address for the second UE is present in the candidate address information for the second UE and whether a relay candidate address is not present in the candidate address information for the second UE. When both these conditions are fulfilled, then the candidate address information for the second UE of the SIP Invite response message is modified to include a second address provided by the originating IMS Access Gateway node as the relay candidate address for the second UE.

In operation, the processor 405 and receiver 402 are configured to receive SIP Invite messages originating from the first UE in relation to the first UE originating a call towards the second UE, and for receiving SIP Invite response messages originating from the second UE. The processor 405 and transmitter 403 are configured to transmit SIP Invite messages originating from the first UE towards the second UE, and for transmitting SIP Invite response messages originating from the second UE towards the first UE.

In particular the receiver 402 is configured to receive a SIP Invite message originating from the first UE, the SIP Invite message including candidate address information for the first UE. The processor 405 is configured to modify the received SIP Invite message if a server reflexive candidate address for the first UE is present in the candidate address information for the first UE and if a relay candidate address for the first UE is not present in the candidate address information for the first UE.

If the processor 405 proceeds to modify the received SIP Invite message, then the processor 405 modifies the SIP Invite message candidate address information for the first UE to include a first address provided by an originating IMS Access Gateway node as the relay candidate address for the first UE. The processor 405 and transmitter 403 are then configured to forward the modified SIP Invite message to a further IMS node for routing the SIP Invite message towards the second UE. Otherwise, when the processor 405 does not proceed to modify the SIP Invite message, the processor 405 and transmitter 403 are configured to forward the received SIP Invite message to the further IMS node for routing the SIP Invite message towards the second UE. The candidate address information for the first UE is for use by the second UE when performing ICE procedures.

The receiver 402 is further configured to receive a SIP Invite response message originating from the second UE. The SIP Invite response message associated with the SIP Invite message originating from the first UE. The SIP Invite response message includes candidate address information for the second UE. The processor 405 is configured to modify the received SIP Invite response message if a server reflexive candidate address for the second UE is present in the candidate address information for the second UE and a relay candidate address for the second UE is not present in the candidate address information for the second UE.

If the processor 405 proceeds to modify the received SIP Invite response message, then the processor 405 modifies the SIP Invite response message candidate address information for the second UE to include a second address provided by the originating IMS AGW node as the relay candidate address for the second UE. The processor 405 and transmitter 403 are further configured to forward the modified SIP Invite response message to the first UE. Otherwise, when the processor 405 does not proceed to modify the received SIP Invite response message, the processor 405 and transmitter are configured to forward the received SIP Invite response message to the first UE. The candidate address information for the second UE is for use by the first UE when performing ICE procedures.

FIG. 5 illustrates a schematic diagram for an example of a network node 501 with P-CSCF functionality (e.g. IMS P-CSCF node 114a and/or 114b) for use in implementing the methods, processes and/or the solutions according to the invention associated with a terminating side of a call originated by a first UE towards a second UE. The network node 501 can be implemented as a combination of computer hardware and software, and can be configured to operate as a terminating P-CSCF node in accordance with the solutions described above. When operating as a terminating P-CSCF node, the network node 501 includes a receiver 502, a transmitter 503, a memory 504 and a processor 505, which are connected together. The memory 504 stores the various programs/executable files that are implemented by the processor 505 and also provides a storage unit for any required data e.g. data representative of transport addresses associated with one or more UEs. The programs/executable files stored in the memory 504, and implemented by processor 505, include one or more of, but are not limited to, a terminating modify SIP Invite response unit 507.

The terminating SIP Invite response unit 507 includes program instructions for determining, on receiving a SIP Invite response message originating from the second UE in response to the SIP Invite message from the first UE (the SIP Invite response message including candidate address information for the second UE), whether a server reflexive candidate address for the second UE is present in the candidate address information for the second UE, and whether a relay candidate address is not present in the candidate address information for the second UE, and whether the relay candidate address for the first UE was not present in the associated received SIP Invite message candidate address information for the first UE. When these conditions are fulfilled, then the candidate address information for the second UE of the SIP Invite response message is modified to include a second address provided by the originating IMS Access Gateway node as the relay candidate address for the second UE.

In operation, the processor 505 and receiver 502 are configured to receive a SIP Invite message originating from the first UE and to receive a SIP Invite response message originating from the second UE in response to the SIP Invite message originating from the first UE. The processor 505 and transmitter 503 are configured to transmit SIP Invite messages originating from the first UE towards the second UE, and for transmitting SIP Invite response messages originating from the second UE towards the first UE.

In particular the receiver 502 is configured to receive a SIP Invite response message originating from the second UE in response to the SIP Invite message originating from the first UE. The SIP Invite response message includes candidate address information for the second UE. The transmitter 503 is configured to forward the received SIP Invite message towards the second UE. The candidate address information for the first UE is for use by the second UE when performing ICE procedures.

The receiver 502 is further configured to receive a SIP Invite response message originating from the second UE in response to the second UE receiving the SIP Invite message originating from the first UE. The SIP Invite response message includes candidate address information for the second UE. The processor 505 is configured to modify the received SIP Invite response message based on whether a server reflexive candidate address for the second UE is present in the candidate address information for the second UE and whether a relay candidate address for the second UE is not present in the candidate address information for the second UE and whether the relay candidate address for the first UE was not present in the associated received SIP Invite message candidate address information for the first UE.

If the processor 505 proceeds to modify the received SIP Invite response message, then the processor 505 modifies the SIP Invite response message candidate address information for the second UE to include a second address provided by the terminating IMS Access Gateway node as the relay candidate address for the second UE. The processor 505 and transmitter 503 are further configured to forward the modified SIP Invite response message to another IMS node for routing the modified SIP Invite response message towards the first UE. Otherwise, when the processor 505 does not proceed to modify the received SIP Invite response message, the processor 505 and transmitter 503 are configured to forward the received SIP Invite response message to another IMS node for routing the received SIP Invite response message towards the first UE. The candidate address information for the second UE is for use by the first UE when performing ICE procedures.

It will be appreciated by the person of skill in the art that various modifications may be made to the above-described examples and embodiments without departing from the scope of the present invention. For example, whilst the above-described embodiments refer to specific protocols such as SIP signaling protocol and SDP offer/answer models, it is to be appreciated that other signaling protocols or call session protocols and session description protocols may be used in place of SIP signaling and SDP when a first UE originates a call with a second UE. Whilst the above-described embodiments refer to entities, nodes or functions within an IMS network, such as the IMS-AGW node(s), IMS P-CSCF(s), NAT device(s), it is possible that the names used to refer to one of more of these entities, nodes or functions, could change, or that the functionality of one or more of these entities, nodes, or functions may be combined with that of another network entity or IMS node.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, or nodes disclosed or illustrated in the present specification may be incorporated into the invention, whether alone or in any appropriate combination with any other feature, step, or node disclosed or illustrated herein.

The invention claimed is:
1. A method for operating a call originating P-CSCF node for an Interactive Connectivity Establishment (ICE) based network address translation (NAT) traversal in a communications network including an IP Multimedia Subsystem (IMS), a first user equipment (UE), and a second UE, the method comprising:
  receiving a SIP Invite message originating from the first UE, the SIP Invite message comprising candidate address information for the first UE; and
  performing operations as follows when a server reflexive candidate address for the first UE is present in the candidate address information for the first UE and a relay candidate address for the first UE is not present in the candidate address information for the first UE:
    modifying the SIP Invite message candidate address information for the first UE to include a first address provided by an originating IMS Access Gateway (AGW) node as the relay candidate address for the first UE; and
    forwarding the modified SIP Invite message to a further IMS node for routing the SIP Invite message to the second UE;
  forwarding the received SIP Invite message to the further IMS node for routing the SIP Invite message to the second UE when the server reflexive candidate address for the first UE is not present in the candidate address information for the first UE or the relay candidate address for the first UE is present in the candidate address information for the first UE; and
  wherein the candidate address information for the first UE is for use by the second UE when performing ICE operations;
  receiving a SIP Invite response message originating from the second UE, the second UE is behind a terminating IMS AGW node, the SIP Invite response message including candidate address information for the second UE; and
  performing operations as follows when a server reflexive candidate address for the second UE is present in the candidate address information for the second UE and a relay candidate address is not present in the candidate address information for the second UE:
modifying the SIP Invite response message candidate address information for the second UE to include a second address provided by the originating IMS AGW node as the relay candidate address for the second UE; and
forwarding the modified SIP Invite response message to the first UE;
wherein the first UE is behind a first NAT device, the first NAT device being connected between the originating IMS AGW node and the first UE, the method further comprising instructing the originating IMS AGW node to perform address latching towards the first UE for discovering the transport address the first NAT device uses for the first UE; and
wherein the second UE is behind a second NAT device, the second NAT device being connected between the terminating IMS AGW node and the second UE, the method further comprising instructing the originating IMS AGW node to perform address latching towards the second UE for discovering the transport address the second NAT device uses for the second UE.

2. A method according to claim 1, further comprising:
forwarding the received SIP Invite response message to the first UE when a server reflexive candidate address for the second UE is not present in the candidate address information for the second UE or the relay candidate address is present in the candidate address information for the second UE;
wherein the candidate address information for the second UE is for use by the first UE when performing ICE operations.

3. A method according to claim 1, further comprising determining the address of the originating IMS AGW node for use as the relay candidate address.

4. A method according to claim 1, wherein modifying the received SIP Invite message further comprises setting the relay candidate address comprising the address of the originating IMS AGW node to be a default candidate address.

5. A method according to claim 4, further comprising:
receiving an update message from the first or second UEs being the ICE controlling endpoint, the update message indicating that another address candidate other than the relay candidate address comprising the address of the originating IMS AGW node has been selected for use;
setting the another address candidate as the default candidate address; and
removing the address of the originating IMS-AGW node from a media path between the first and second UEs.

6. A method for operating a terminating call P-CSCF node for Interactive Connectivity Establishment (ICE) based NAT traversal in a communications network including an IP Multimedia Subsystem (IMS), a first user equipment (UE), and a second UE, the method comprising:
receiving a SIP Invite message originating from the first UE for the second UE, the SIP Invite message including candidate address information for the first UE; and forwarding the received SIP Invite message to the second UE;
wherein the candidate address information for the first UE is for use by the second UE when performing ICE operations; and
wherein the first UE is behind a first NAT device and an originating IMS Access Gateway node and the second UE is behind a second NAT device and a terminating IMS AGW node, the method further comprising instructing the terminating IMS AGW node to perform address latching towards each UE for discovering the transport address the first NAT device uses for the first UE;
wherein the first NAT device is connected between first UE and the originating IMS Access gateway node and the second NAT device is connected between the second UE and the terminating IMS AGW node; and
receiving a SIP Invite response message originating from the second UE in response to the SIP Invite message originating from the first UE, the SIP invite response message including candidate address information for the second UE;
performing operations as follows when a server reflexive candidate address is present in the candidate address information for the second UE and a relay candidate address for the second UE is not present in the candidate address information for the second UE, and the relay candidate address for the first UE was not present in the associated received SIP Invite message candidate address information for the first UE:
modifying the SIP Invite response message candidate address information for the second UE to include a second address provided by the terminating IMS AGW node as the relay candidate address for the second UE; and
forwarding the modified SIP Invite response message to another IMS node for routing the modified SIP Invite response message to the first UE.

7. A method according to claim 6, further comprising:
forwarding the received SIP Invite response message to another IMS node for routing the received SIP Invite response message to the first UE when the server reflexive candidate address is not present in the candidate address information for the second UE, or the relay candidate address for the second UE is present in the candidate address information for the second UE, or the relay candidate address for the first UE is present in the associated received SIP Invite message candidate address information for the first LIE; and
wherein the candidate address information for the second UE is for use by the first UE when performing ICE operations.

8. A method according to claim 6, further comprising determining the address of the terminating IMS AGW node for use as the relay candidate address for the second UE.

9. A method according to claim 6, wherein the second UE is behind a second NAT device, the method further comprising instructing the terminating IMS AGW node to perform address latching towards each UE for discovering the transport address the second NAT device uses for the second UE.

10. A method according to claim 7, wherein modifying the received SIP Invite response message further comprises setting the relay candidate address comprising the address of the terminating IMS AGW node to be a default candidate address.

11. A method according to claim 10, further comprising:
receiving an update message from the first or second UE, being the ICE controlling endpoint, the update message indicating that another address candidate other than the relay candidate address comprising the second address of the terminating IMS AGW node has been selected for use;
setting the another address candidate as the default candidate address; and
removing the second address of the terminating IMS AGW node from a media path between the first and second UEs.

12. A network node in a communications network including an IP Multimedia Subsystem (IMS), a first user equipment (UE), and a second UE, the network node comprising:
 a receiver, a transmitter, a memory unit, and a processor, the processor being connected to the receiver, to the transmitter, and to the memory unit, wherein:
 the receiver is configured to receive a SIP Invite message originating from the first UE, the SIP Invite message comprising candidate address information for the first UE;
 when a server reflexive candidate address for the first UE is present in the candidate address information for the first UE and a relay candidate address for the first UE is not present in the candidate address information for the first UE, then:
  the processor is configured to modify the SIP Invite message candidate address information for the first UE to include a first address provided by an originating IMS Access Gateway node as the relay candidate address for the first UE; and
  the transmitter is configured to forward the modified SIP Invite message to a further IMS node for routing the SIP Invite message to the second UE;
 the transmitter is further configured to forward the received SIP Invite message to the further IMS node for routing the SIP Invite message to the second UE when the server reflexive candidate address for the first UE is not present in the candidate address information for the first UE or a relay candidate address for the first UE is present in the candidate address information for the first UE; and
 wherein the candidate address information for the first UE is for use by the second UE when performing Interactive Connectivity Establishment (ICE) operations;
 the receiver is further configured to receive a SIP Invite response message originating from the second UE, the second UE is behind a terminating IMS AGW node, the SIP Invite response message including candidate address information for the second UE; and
 when a server reflexive candidate address for the second UE is present in the candidate address information for the second UE and a relay candidate address is not present in the candidate address information for the second UE, then:
  the processor is configured to modify the SIP Invite response message candidate address information for the second UE to include a second address provided by the originating IMS AGW node as the relay candidate address for the second UE; and forwarding the modified SIP Invite response message to the first UE; and
  the transmitter is configured to forward the modified SIP Invite response message to the first UE;
 wherein the first UE is behind a first NAT device, the first NAT device being connected between the originating IMS AGW node and the first UE, the method further comprising instructing the originating IMS AGW node to perform address latching towards the first UE for discovering the transport address the first NAT device uses for the first UE; and
 wherein the second UE is behind a second NAT device, the second NAT device being connected between the terminating IMS AGW node and the second UE, the method further comprising instructing the originating IMS AGW node to perform address latching towards the second UE for discovering the transport address the second NAT device uses for the second UE.

13. A network node according to claim 12, wherein:
 the transmitter is further configured to forward the received SIP Invite response message to the first UE when the server reflexive candidate address for the second UE is not present in the candidate address information for the second UE, or a relay candidate address for the second UE is not present in the candidate address information for the second UE;
 wherein the candidate address information for the second UE is for use by the first UE when performing ICE operations.

14. A network node in a communications network including an IP Multimedia Subsystem, IMS, a first user equipment, UE, a second UE, the network node comprising:
 a receiver, a transmitter, a memory unit, and a processor, the processor being connected to the receiver, to the transmitter, and to the memory unit wherein:
 the receiver is configured to receive a SIP Invite message originating from the first UE for the second UE, the SIP Invite message including candidate address information for the first UE; and
 the transmitter is configured to forward the received SIP Invite message to the second UE; wherein the candidate address information for the first UE is for use by the second UE when performing Interactive Connectivity Establishment (ICE) operations; and
 wherein the first UE is behind a first NAT device and an originating IMS Access Gateway node and the second UE is behind a second NAT device and a terminating IMS AGW node, the processor being configured to instruct the terminating IMS AGW node to perform address latching towards each UE for discovering the transport address the first NAT device uses for the first UE;
 wherein the first NAT device is connected between first UE and the originating IMS Access gateway node and the second NAT device is connected between the second UE and the terminating IMS AGW node; and
 the receiver is further configured to receive a SIP Invite response message originating from the second UE in response to the SIP Invite message originating from the first UE, the SIP invite response message including candidate address information for the second UE;
 when a server reflexive candidate address is present in the candidate address information for the second UE, and a relay candidate address for the second UE is not present in the candidate address information for the second UE, and the relay candidate address for the first UE was not present in the associated received SIP Invite message candidate address information for the first UE, then:
  the processor is further configured to modify the SIP Invite response message candidate address information for the second UE to include a second address provided by the terminating IMS AGW node as the relay candidate address for the second UE; and
  the transmitter is further configured to forward the modified SIP Invite response message to another IMS node for routing the modified SIP Invite response message to the first UE.

15. A network node according to claim 14, wherein:
 the transmitter is further configured to forward the received SIP Invite response message to another IMS node for routing the received SIP Invite response message to the first UE when the server reflexive candidate address is not present in the candidate address information for the second UE, or a relay candidate address for the second UE is present in the candidate address information for the second UE, or the relay candidate address for the first UE is present in the associated received SIP Invite message candidate address information for the first UE;

wherein the candidate address information for the second UE is for use by the first UE when performing ICE operations.

* * * * *

UNITED STATES PATENT AND TRADEMARK OFFICE
CERTIFICATE OF CORRECTION

PATENT NO.       : 9,137,200 B2
APPLICATION NO.  : 13/388236
DATED            : September 15, 2015
INVENTOR(S)      : Blau et al.

Page 1 of 1

It is certified that error appears in the above-identified patent and that said Letters Patent is hereby corrected as shown below:

On the Title Page, Item (57), under "ABSTRACT", in Column 2, Line 13,
delete "t the" and insert -- to the --, therefor.

Claims

In Column 26, Line 40, in Claim 7, delete "first LIE;" and insert -- first UE; --, therefor.

Signed and Sealed this
Twenty-ninth Day of March, 2016

Michelle K. Lee
*Director of the United States Patent and Trademark Office*